(12) United States Patent
Ishii et al.

(10) Patent No.: US 7,805,272 B2
(45) Date of Patent: Sep. 28, 2010

(54) SENSING CIRCUIT, OPTICAL DETECTION CIRCUIT, DISPLAY DEVICE, AND ELECTRONIC APPARATUS

(75) Inventors: Ryo Ishii, Matsumoto (JP); Takashi Sato, Chino (JP); Takashi Kunimori, Tottori (JP)

(73) Assignee: Seiko Epson Corporation, Tokyo (JP)

( * ) Notice: Subject to any disclaimer, the term of this patent is extended or adjusted under 35 U.S.C. 154(b) by 317 days.

(21) Appl. No.: 12/140,513

(22) Filed: Jun. 17, 2008

(65) Prior Publication Data

US 2008/0319695 A1 Dec. 25, 2008

(30) Foreign Application Priority Data

Jun. 19, 2007 (JP) ............................. 2007-161001

(51) Int. Cl.
*G01C 19/00* (2006.01)

(52) U.S. Cl. ...................................... 702/104

(58) Field of Classification Search ................. 702/104
See application file for complete search history.

(56) References Cited

U.S. PATENT DOCUMENTS

2009/0109409 A1* 4/2009 Haraguchi et al. ............ 353/85
2009/0237382 A1* 9/2009 Kunimori .................... 345/207

FOREIGN PATENT DOCUMENTS

JP A-06-350803 12/1994

* cited by examiner

*Primary Examiner*—Aditya Bhat
(74) *Attorney, Agent, or Firm*—Oliff & Berridge, PLC

(57) ABSTRACT

A sensing circuit includes a first sensing element, a second sensing element, a reduction unit, a storage unit, a specifying unit and a detection unit. The reduction unit reduces the amount of the energy applied to the second sensing element. The storage unit stores a degradation characteristic of the sensing element. The specifying unit specifies a rate of degradation. The detection unit detects the amount of the energy on the basis of the rate of degradation.

22 Claims, 13 Drawing Sheets

FIG. 7

| ADD(Hex) | 0 | 1 | 2 | 3 | 4 | 5 | 6 | 7 | 8 |
|---|---|---|---|---|---|---|---|---|---|
| h | 1 | 2 | 3 | 4 | 5 | 6 | 7 | 8 | 9 |
| d(Dec) | 1.000 | 0.985 | 0.976 | 0.970 | 0.965 | 0.961 | 0.958 | 0.955 | 0.952 |
| d(Hex) | FFF | FC2 | F9E | F84 | F70 | F60 | F52 | F47 | F3C |
| ADD(Hex) | 10 | 11 | 12 | 13 | 14 | 15 | 16 | 17 | 18 |
| h | 10 | 20 | 30 | 40 | 50 | 60 | 70 | 80 | 90 |
| d(Dec) | 0.950 | 0.935 | 0.926 | 0.920 | 0.915 | 0.911 | 0.908 | 0.905 | 0.902 |
| d(Hex) | F33 | EF5 | ED1 | EB7 | EA4 | E93 | E86 | E7A | E6F |
| ADD(Hex) | 20 | 21 | 22 | 23 | 24 | 25 | 26 | 27 | 28 |
| h | 100 | 200 | 300 | 400 | 500 | 600 | 700 | 800 | 900 |
| d(Dec) | 0.900 | 0.885 | 0.876 | 0.870 | 0.865 | 0.861 | 0.858 | 0.855 | 0.852 |
| d(Hex) | E66 | E28 | E04 | DEB | DD7 | DC7 | DB9 | DAD | DA2 |
| ADD(Hex) | 30 | 31 | 32 | 33 | 34 | 35 | 36 | 37 | 38 |
| h | 1000 | 2000 | 3000 | 4000 | 5000 | 6000 | 7000 | 8000 | 9000 |
| d(Dec) | 0.850 | 0.835 | 0.826 | 0.820 | 0.815 | 0.811 | 0.808 | 0.805 | 0.802 |
| d(Hex) | D99 | D5B | D37 | D1E | D0A | CFA | CEC | CE0 | CD6 |
| ADD(Hex) | 40 | 41 | 42 | 43 | 44 | 45 | 46 | 47 | 48 |
| h | 10000 | 20000 | 30000 | 40000 | 50000 | 60000 | 70000 | 80000 | 90000 |
| d(Dec) | 0.800 | 0.785 | 0.776 | 0.770 | 0.765 | 0.761 | 0.758 | 0.755 | 0.752 |
| d(Hex) | CCC | C8F | C6B | C51 | C3D | C2D | C1F | C13 | C09 |
| ADD(Hex) | 50 | 51 | 52 | 53 | 54 | 55 | 56 | 57 | 58 |
| h | 100000 | 200000 | 300000 | 400000 | 500000 | 600000 | 700000 | 800000 | 900000 |
| d(Dec) | 0.750 | 0.735 | 0.726 | 0.720 | 0.715 | 0.711 | 0.708 | 0.705 | 0.702 |
| d(Hex) | BFF | BC2 | B9E | B84 | B70 | B60 | B52 | B47 | B3C |

FIG. 13

| ADD(Hex) | 0 | 1 | 2 | 3 | 4 | 5 | 6 | 7 | 8 | 9 | ... |
|---|---|---|---|---|---|---|---|---|---|---|---|
| k(Dec) | 10.83 | 10.73 | 10.67 | 10.63 | 10.59 | 10.57 | 10.54 | 10.52 | 10.51 | 10.49 | ... |
| k(Hex) | AD47 | ABA4 | AAAF | AA01 | A97A | A90B | A8AE | A85E | A816 | A7D7 | ... |
| d(Dec) | 1.000 | 0.985 | 0.976 | 0.970 | 0.965 | 0.961 | 0.958 | 0.955 | 0.952 | 0.950 | ... |
| d(Hex) | FFF | FC2 | F9E | F84 | F70 | F60 | F52 | F47 | F3C | F33 | ... |

SENSING CIRCUIT, OPTICAL DETECTION CIRCUIT, DISPLAY DEVICE, AND ELECTRONIC APPARATUS

BACKGROUND

1. Technical Field

The present invention relates to a sensing circuit and an optical detection circuit capable of detecting a luminance, a temperature, and the like, and a display device and an electronic apparatus using the same.

2. Related Art

In an optical sensor that uses an amorphous silicon thin film transistor as a photoelectric conversion element, a difference between a detected luminance and a true luminance gradually increases with time. This is because the phenomenon of photodegradation that the conductivity decreases with increasing integrated luminance occurs. In order to eliminate a deviation of the detected luminance caused by such photodegradation, for example, JP-A-6-350803 discloses using two equal photoelectric conversion elements.

Specifically, JP-A-6-350803 discloses a line image sensor in which photoelectric conversion elements 1 and 2, which have almost the same structure as a thin film transistor used in an active-matrix-driving type liquid crystal display or the like and have the same properties, are connected in series (paragraph 0045 and FIG. 2 in JP-A-6-350803). Irradiated light 100a that is emitted from a light source and is reflected from a surface of a document 104 is incident on the photoelectric conversion element 1. In addition, irradiated light 100b that is emitted from the same light source and is reflected from a reflection surface 106 is incident on the photoelectric conversion element 2 (FIG. 1B and paragraph 0041 in JP-A-6-350803). In the equivalent circuit shown in FIG. 2 in JP-A-6-350803, assuming that the electric potential of a power source is Vd, electric resistance of the photoelectric conversion element 1 is Ra, and electric resistance of the photoelectric conversion element 2 is Rb, the electric potential Vo of an image read signal that is an output of the line image sensor is expressed as the following Equation (paragraph 0048 in JP-A-6-350803).

$$Vo=(Vd)/\{1+(Rb/Ra)\}$$

Here, the irradiated light 100a incident on the photoelectric conversion element 1 and the irradiated light 100b incident on the photoelectric conversion element 2 are emitted from the same light source. Accordingly, even if the radiation intensity of the light source changes, the electric potential Vo of the image read signal does not depend on the radiation intensity but depends only on the concentration of a surface of a document containing image information (paragraph 0049 in JP-A-6-350803). Moreover, in the case of a document generally used, a region of a white color having a high reflectance occupies about 95% of the whole area of the document. Accordingly, in order to make the irradiated light 100b, which has the same luminance as the irradiated light 100a incident on the photoelectric conversion element 1, incident on the photoelectric conversion element 2 when the white document is read, the reflection surface 106 having a high reflectance is provided such that the degree of photodegradation of the photoelectric conversion element 1 is made to be approximately equal to that of the photoelectric conversion element 2 (paragraphs 0053, 0054, and 0056 in JP-A-6-350803). For this reason, in above Equation, Rb/Ra (ratio of electric resistance between the photoelectric conversion elements 1 and 2) is constant if the concentration of the document surface is the same. Accordingly, even if electric conductivities of the photoelectric conversion elements 1 and 2 decrease due to photodegradation, the ratio of electric resistance between the photoelectric conversion elements 1 and 2 does not change and the potential Vo of the image read signal is not affected by photodegradation (paragraphs 0028 and 0051 in JP-A-6-350803).

In order to eliminate the deviation of the detected luminance caused by photodegradation by using the technique disclosed in JP-A-6-350803, it is necessary to make the degree of photodegradation of the photoelectric conversion element 1 approximately equal to that of the photoelectric conversion element 2. Regarding this point, JP-A-6-350803 discloses that the luminance of the irradiated light 100b incident on the photoelectric conversion element 2 is preferably set targeting a white color because about 95% of the whole area of a document generally used is a white color having a high reflectance. However, there are many cases in which a rate of a white color in a document to be read is less than 10%, for example, like a case of reading a color print image. In this case, the difference between the integrated luminance of the photoelectric conversion element 1 and the integrated luminance of the photoelectric conversion element 2 increases gradually and reaches the size not negligible eventually. That is, since the degree of photodegradation of the photoelectric conversion element 1 and the degree of photodegradation of photoelectric conversion element 2 cannot be maintained approximately equal, a precise sensor output can be obtained.

In addition, for example, in the case of an optical sensor that detects the luminance (ambient brightness) of environmental light, it is not necessary to read a document image unlike the line image sensor. In such an optical sensor, a deviation of a detected luminance caused by photodegradation cannot be corrected even if the same environmental light is incident on two photoelectric conversion elements having the same photoelectric conversion characteristics.

SUMMARY

An advantage of some aspects of the invention is to provide a sensing circuit and an optical detection circuit capable of accurately correcting a deviation of a detection value caused by temporal degradation of a sensing element by using two sensing elements having the same sensing characteristic and a display device and an electronic apparatus using the same. In addition, another advantage of some aspects of the invention is to make it possible to correct a deviation of a detection value caused by temporal degradation of a sensing element by using two sensing elements having the same sensing characteristic even in cases of sensors other than an image sensor.

According to a first aspect of the invention, a sensing circuit includes: a first sensing element that outputs a first output signal with a level corresponding to the size of energy to be measured; a second sensing element that has the same input and output characteristics as the first sensing element and outputs a second output signal with a level corresponding to the size of energy to be measured; a reduction unit that reduces the size of the energy applied to the second sensing element in a predetermined reduction rate; a storage unit that stores as a degradation characteristic the relationship between a first rate of degradation, which indicates a degree of degradation of the input and output characteristics of the first sensing element, and an integrated value that is a product of the size of the energy applied to the first sensing element and a time; a specifying unit that specifies a plurality of sets of the first rate of degradation and a second rate of degradation, which indicates a degree of degradation of the input and output characteristics of the second sensing element, by referring to the degradation characteristic in consideration of the predetermined reduction rate, calculates the size of the energy applied to the first sensing element and the size of the energy input to the reduction unit on the basis of each of the specified plurality of sets of the first rate of degradation and the second rate of degradation, the first output signal and the second output signal, and the predetermined reduction rate, and specifies the set of the first rate of degradation and the second rate of degradation whose difference becomes a minimum on the basis of a result of the calculation; and a detection unit that detects the size of the energy on the basis of the first rate of degradation specified by the specifying unit and the first output signal.

According to the aspect of the invention, since the first sensing element and the second sensing element having the same input and output characteristics are used and the progress of degradation of the input and output characteristics of the second sensing element is delayed by the reduction unit, the rate of degradation of the first sensing element can be specified on the basis of the first output signal and the second output signal, the predetermined reduction rate, and the degradation characteristic stored in the storage unit. Therefore, by calculating the size of energy using the specified rate of degradation and the first output signal, an accurate detection value can be obtained even if the input and output characteristics of the first sensing element or the second sensing element are degraded. In addition, examples of energy to be measured include light energy and heat energy, for example. That is, the invention may be applied to an optical sensor that detects the intensity of light (luminance) or a temperature sensor that detects the temperature, for example. In addition, examples of the sensing element include a photoelectric conversion element or a thermo-sensitive element.

Furthermore, in the sensing circuit described above, the detection unit may detect the size of the energy on the basis of the second rate of degradation specified by the specifying unit, the second output signal, and the predetermined reduction rate instead of detecting the size of the energy on the basis of the first rate of degradation specified by the specifying unit and the first output signal. Even in this configuration, an accurate detection value can be obtained.

In addition, according to another aspect of the invention, a sensing circuit includes: a first sensing element that outputs a first output signal with a level corresponding to the size of energy to be measured; a second sensing element that has the same input and output characteristics as the first sensing element and outputs a second output signal with a level corresponding to the size of energy to be measured; a reduction unit that reduces the size of the energy applied to the second sensing element in a predetermined reduction rate; a storage unit that stores as a degradation characteristic the relationship between a first rate of degradation, which indicates a degree of degradation of the input and output characteristics of the first sensing element, and an output ratio that is a ratio between a level of the first output signal and a level of the second output signal; a specifying unit that calculates a ratio between a level of the first output signal and a level of the second output signal, compares the calculated ratio with an output ratio of the degradation characteristic obtained by referring to the storage unit, and specifies the first rate of degradation on the basis of a result of the comparison; and a detection unit that detects the size of the energy on the basis of the first rate of degradation specified by the specifying unit and the first output signal.

According to the aspect of the invention, since the first sensing element and the second sensing element having the same input and output characteristics are used and the progress of degradation of the input and output characteristics of the second sensing element is delayed by the reduction unit, the rate of degradation of the first sensing element can be specified on the basis of the ratio between the level of the first output signal and the level of the second output signal, the predetermined reduction rate, and the degradation characteristic stored in the storage unit. Therefore, by calculating the size of energy using the specified rate of degradation and the first output signal, an accurate detection value can be obtained even if the input and output characteristics of the first sensing element or the second sensing element are degraded. In addition, examples of energy to be measured include light energy and heat energy, for example. That is, the invention may be applied to an optical sensor that detects the luminance or a temperature sensor that detects the temperature, for example. In addition, examples of the sensing element include a photoelectric conversion element or a thermo-sensitive element.

Furthermore, in the sensing circuit described above, the storage unit may store as the degradation characteristic the relationship between a second rate of degradation, which indicates a degree of degradation of the input and output characteristics of the second sensing element, and the output ratio, which is a ratio between the level of the first output signal and the level of the second output signal, instead of storing as the degradation characteristic the relationship between the first rate of degradation, which indicates the degree of degradation of the input and output characteristics of the first sensing element, and the output ratio that is a ratio between the level of the first output signal and the level of the second output signal. The specifying unit may calculate the ratio between the level of the first output signal and the level of the second output signal, compare the calculated ratio with the output ratio of the degradation characteristic obtained by referring to the storage unit, and specify the second rate of degradation on the basis of a result of the comparison instead of calculating the ratio between the level of the first output signal and the level of the second output signal, comparing the calculated ratio with the output ratio of the degradation characteristic obtained by referring to the storage unit, and specifying the first rate of degradation on the basis of a result of the comparison. The detection unit may detect the size of the energy on the basis of the second rate of degradation specified by the specifying unit, the second output signal, and the predetermined reduction rate instead of detecting the size of the energy on the basis of the first rate of degradation specified by the specifying unit and the first output signal. Even in this configuration, an accurate detection value can be obtained.

In addition, according to still another aspect of the invention, an optical detection circuit includes: a first photoelectric conversion element that outputs a first output signal with a level corresponding to the luminance of incident light; a second photoelectric conversion element that has the same photoelectric conversion characteristic as the first photoelectric conversion element and outputs a second output signal with a level corresponding to the luminance of incident light; a light reducing unit that reduces the luminance of incident light in a predetermined light reduction rate and outputs the reduced light to the second photoelectric conversion element; a storage unit that stores the relationship between a rate of degradation, which indicates a degree of degradation of efficiency of photoelectric conversion, and an integrated luminance; an acquisition unit that assuming that an integrated luminance of the first photoelectric conversion element is a first integrated luminance, an integrated luminance of the second integrated luminance is a second integrated luminance, the rate of degradation corresponding to the first integrated luminance is a first rate of degradation, and the rate of degradation corresponding to the second integrated luminance is a second rate of degradation, specifies a set of the first integrated luminance and the second integrated luminance in consideration of the predetermined light reduction rate, refers to the relationship between the rate of degradation and the integrated luminance stored in the storage unit on the basis of the first integrated luminance and the second integrated luminance that are specified, and acquires a set of the first rate of degradation and the second rate of degradation corresponding to the set of the first integrated luminance and the second integrated luminance that are specified; a difference calculating unit that assuming that the luminance of light incident on the first photoelectric conversion element is a first luminance and the luminance of light incident on the second photoelectric conversion element through the light reducing unit is a second luminance, calculates the first luminance on the basis of the first output signal and the first rate of degradation, calculates the second luminance on the basis of the second output signal and the second rate of degradation, and calculates a difference between the first luminance and the second luminance; and a calculation unit that supplies to the difference calculating unit a set of the first rate of degradation and the second rate of degradation obtained by using the acquisition unit, specifies the first rate of degradation when the difference becomes a minimum, and calculates the luminance of incident light on the basis of the first rate of degradation specified and the first output signal.

According to the aspect of the invention, since the first photoelectric conversion element and the second photoelectric conversion element having the same photoelectric conversion characteristic are used and the progress of photodegradation of the second photoelectric conversion element is delayed by the light reducing unit, the rate of degradation of the first photoelectric conversion element can be specified on the basis of the first output signal and the second output signal and the relationship (characteristic of degradation of photoelectric conversion efficiency with respect to integrated luminance) between the rate of degradation and the integrated luminance stored in the storage unit. Therefore, by calculating the luminance of incident light using the specified rate of degradation and the first output signal, an accurate detected luminance can be obtained even if the conductivity of the first photoelectric conversion element or the second photoelectric conversion element decreases due to photodegradation. In addition, an example of the same photoelectric conversion characteristic includes a case where degradation characteristics of photoelectric conversion efficiency are equal.

Furthermore, in the optical detection circuit described above, the calculation unit may specify the second rate of degradation when the difference becomes a minimum and calculate the luminance of incident light on the basis of the second rate of degradation specified, the second output signal, and the predetermined light reduction rate instead of specifying the first rate of degradation when the difference becomes a minimum and calculating the luminance of incident light on the basis of the first rate of degradation specified and the first output signal. Even in this configuration, an accurate detection luminance can be obtained. Furthermore, in the optical detection circuit described above, the storage unit may store a plurality of rates of degradation, which indicate a degree of degradation of efficiency of photoelectric conversion, and a plurality of integrated luminances so as to correspond to each other or may store a function that defines the relationship between a rate of degradation, which indicates a degree of degradation of efficiency of photoelectric conversion, and an integrated luminance.

In addition, according to still another aspect of the invention, an optical detection circuit includes: a first photoelectric conversion element that outputs a first output signal with a level corresponding to the luminance of incident light; a second photoelectric conversion element that has the same photoelectric conversion characteristic as the first photoelectric conversion element and outputs a second output signal with a level corresponding to the luminance of incident light; a light reducing unit that reduces the luminance of incident light in a predetermined light reduction rate and outputs the reduced light to the second photoelectric conversion element; a storage unit that stores the relationship between a rate of degradation, which indicates a degree of degradation of efficiency of photoelectric conversion in the first photoelectric conversion element, and an output ratio indicating a ratio between a level of the first output signal and a level of the second output signal; an output ratio calculating unit that calculates the output ratio; a difference calculating unit that calculates a difference between each of a plurality of output ratios acquired by referring to the storage unit and the output ratio calculated in the output ratio calculating unit; and a calculation unit that specifies the rate of degradation when the difference becomes a minimum and calculates the luminance of incident light on the basis of the specified rate of degradation and the first output signal.

According to the aspect of the invention, since the first photoelectric conversion element and the second photoelectric conversion element having the same photoelectric conversion characteristic are used and the progress of photodegradation of the second photoelectric conversion element is delayed by the light reducing unit, the rate of degradation of the first photoelectric conversion element can be specified on the basis of the ratio (output ratio) between the level of the first output signal and the level of the second output signal and the relationship (characteristic of degradation of photoelectric conversion efficiency with respect to output ratio) between the rate of degradation and the output ratio stored in the storage unit. Therefore, by calculating the luminance of incident light using the specified rate of degradation and the first output signal, an accurate detected luminance can be obtained even if the conductivity of the first photoelectric conversion element or the second photoelectric conversion element decreases due to photodegradation. In addition, an example of the same photoelectric conversion characteristic includes a case where degradation characteristics of photoelectric conversion efficiency are equal.

Furthermore, in the optical detection circuit described above, the storage unit may store the relationship between a rate of degradation, which indicates a degree of degradation of efficiency of photoelectric conversion in the second photoelectric conversion element, and the output ratio indicating a ratio between the level of the first output signal and the level of the second output signal instead of storing the relationship between the rate of degradation, which indicates the degree of degradation of efficiency of photoelectric conversion in the first photoelectric conversion element, and the output ratio indicating a ratio between the level of the first output signal and the level of the second output signal. The calculation unit may calculate the luminance of incident light on the basis of the specified rate of degradation, the second output signal, and the predetermined light reduction rate instead of calculating the luminance of incident light on the basis of the specified rate of degradation and the first output signal. Even in this configuration, an accurate detection luminance can be obtained.

Furthermore, in the optical detection circuit described above, the storage unit may store a plurality of rates of degradation, each of which indicates a degree of degradation of efficiency of photoelectric conversion in the first photoelectric conversion element, and output ratios, each of which indicates a ratio between a level of the first output signal and a level of the second output signal, so as to correspond to each other. Furthermore, in the optical detection circuit described above, the storage unit may store a function that defines the relationship between a rate of degradation, which indicate a degree of degradation of efficiency of photoelectric conversion in the first photoelectric conversion element, and an output ratio, which indicates a ratio between a level of the first output signal and a level of the second output signal. Furthermore, in the optical detection circuit described above, the storage unit may store a plurality of rates of degradation, each of which indicates a degree of degradation of efficiency of photoelectric conversion in the second photoelectric conversion element, and output ratios, each of which indicates a ratio between a level of the first output signal and a level of the second output signal, so as to correspond to each other. Furthermore, in the optical detection circuit described above, the storage unit may store a function that defines the relationship between a rate of degradation, which indicate a degree of degradation of efficiency of photoelectric conversion in the second photoelectric conversion element, and an output ratio, which indicates a ratio between a level of the first output signal and a level of the second output signal.

In addition, the first photoelectric conversion element and the second photoelectric conversion element may be amorphous silicon thin film transistors, low-temperature polysilicon thin film transistors, or high-temperature polysilicon thin film transistors, for example. In addition, the light reducing unit may be a filter having a predetermined light transmittance, such as a green color filter, for example.

In addition, according to still another aspect of the invention, a display device includes: the optical detection circuit described above; a display unit that displays an image; and an adjustment unit that adjusts the luminance of an image on the display unit on the basis of an output signal of the optical detection circuit. Examples of the display device include a liquid crystal display device and an electro-optical device using an electro-optical element other than a liquid crystal element, for example. In addition, according to still another aspect of the invention, an electronic apparatus includes the display device described above. Examples of the electronic apparatus include a personal computer, a mobile phone, and a personal digital assistant, for example.

BRIEF DESCRIPTION OF THE DRAWINGS

The invention will be described with reference to the accompanying drawings, wherein like numbers reference like elements.

FIG. 7 is a view illustrating the data configuration of profile data of integrated luminance—rate of photodegradation.

FIG. 13 is a view illustrating the data configuration of profile data of leak current ratio—rate of photodegradation.

DESCRIPTION OF EXEMPLARY EMBODIMENTS

1. First Embodiment

Figure 1:
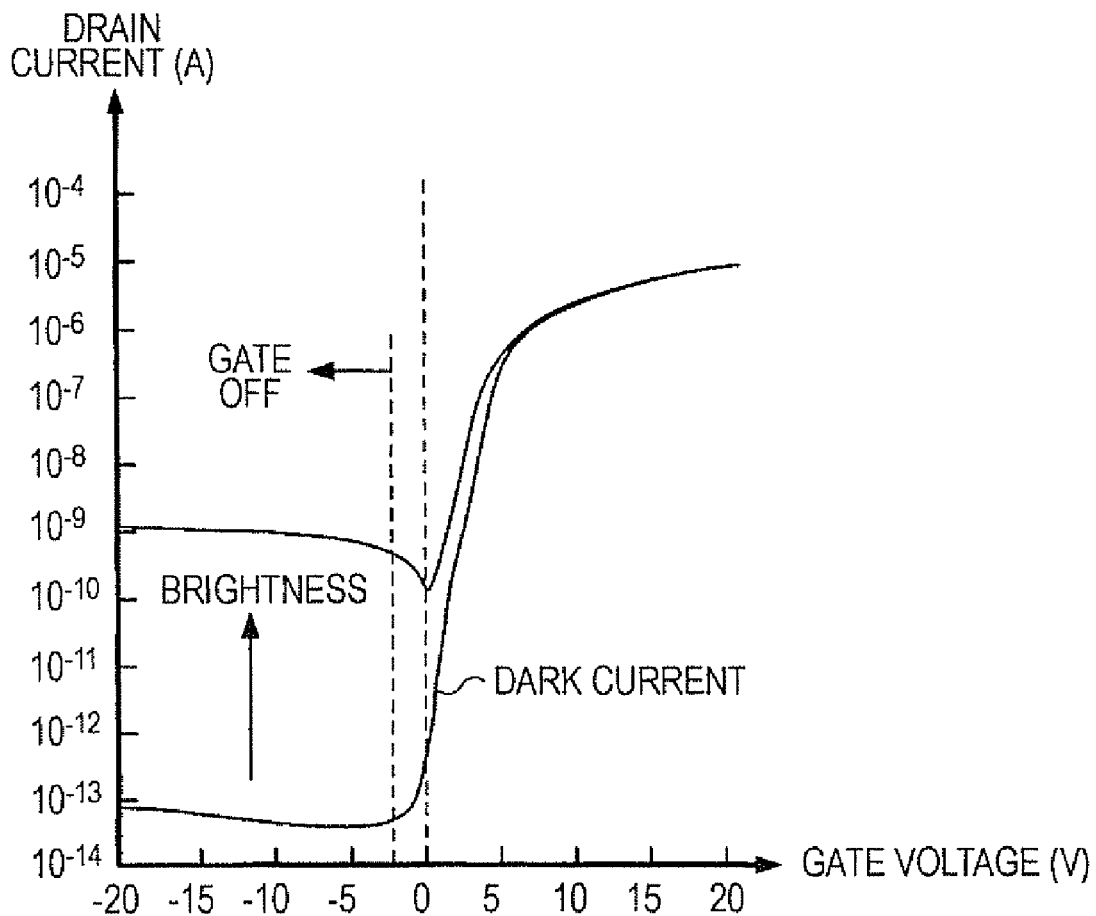
FIG. 1 is a graph illustrating the relationship between a gate voltage and a drain current of an a-Si TFT according to a first embodiment of the invention.

FIG. 1 is a graph illustrating the relationship between a gate voltage and a drain current of an a-Si TFT (amorphous silicon TFT: amorphous silicon thin film transistor) used as a photoelectric conversion element. Noting a period of time for which a gate is in an OFF state, in the case when light does not be incident on a channel portion, only a leak current (drain current) of $10^{-13}$ A or less flows as shown as a dark current in the drawing. In contrast, in the case when light is incident on the channel portion during the same period of time for which the gate is in the OFF state, a leak current corresponding to the intensity (brightness) of the light that is incident on the channel portion flows. That is, in the case of the a-Si TFT, the intensity of a leak current during a period of time for which the gate is in the OFF state is proportional to the intensity of light that is incident on the channel portion.

Figure 2:
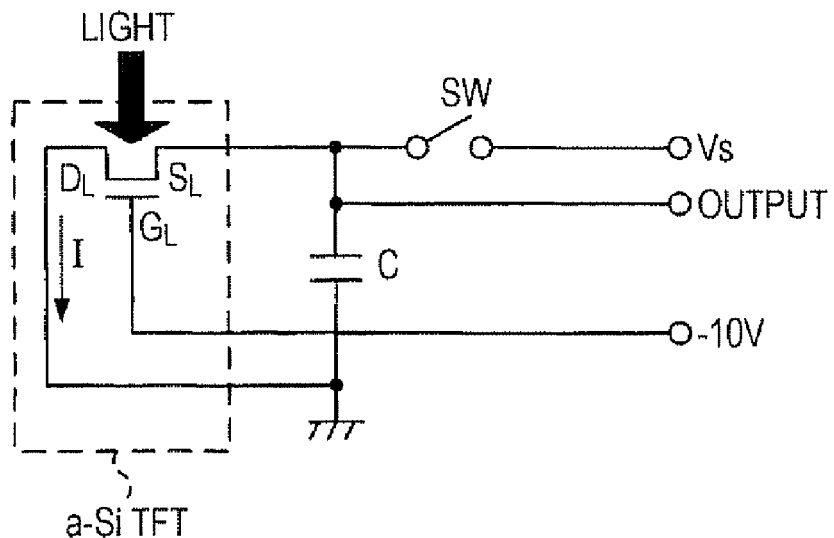
FIG. 2 is a circuit diagram illustrating the configuration of a circuit that detects the luminance using a-Si TFT.
Figure 3:
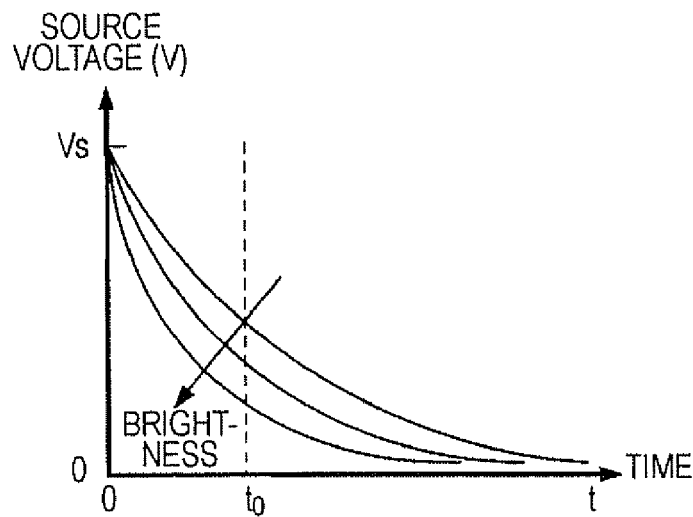
FIG. 3 is a graph illustrating a discharge characteristic of a capacitor in the circuit shown in FIG. 2.

It is preferable to use a circuit shown in FIG. 2 when the luminance is detected by using a-Si TFT having such a leak current characteristic. As shown in the drawing, a gate voltage of −10 V is applied to a gate electrode GL of the a-Si TFT such that the gate of the a-Si TFT is always in an OFF state. Then, a switch SW is turned on to apply a voltage Vs (for example, +2 V) to a capacitor C and then the switch SW is turned off. As a result, a voltage between both ends of the capacitor C gradually decreases from the voltage Vs with time. At this time, a discharge characteristic of the capacitor C changes with the intensity of a leak current I of the a-Si TFT, that is, the intensity of light that is incident on the channel portion of the a-Si TFT. Specifically, the voltage of the capacitor C quickly decreases as the intensity of light that is incident on the channel portion of the a-Si TFT increases, as shown in FIG. 3.

Accordingly, if the voltage of the capacitor C is measured at a point of time when a reference time $t_0$ set beforehand has elapsed after turning off the switch SW, the voltage and the intensity of light that is incident on the channel portion of the a-Si TFT are in inverse proportion to each other. Thus, by storing profile data, which indicates the relationship between the voltage value of the capacitor C and the intensity of light that is incident on the channel portion of the a-Si TFT at a point of time when a predetermined reference time $t_0$ has elapsed, in a memory beforehand, the intensity of light that is incident on the channel portion of the a-Si TFT can be calculated from the measured voltage value of the capacitor C by referring to the profile data.

However, in the circuit shown in FIG. 2, a difference occurs between a detected luminance and a true luminance due to the phenomenon of photodegradation of the a-Si TFT that the conductivity decreases with increasing integrated luminance. For this reason, it is difficult to make an accurate measurement of the luminance. Therefore, an optical sensor circuit in the present embodiment has a circuit shown in FIG. 4. The circuit shown in FIG. 4 has two circuits shown in FIG. 2. The same a-Si TFTs are used as an a-Si TFT1 and an a-Si TFT2 and photoelectric conversion characteristics of the a-Si TFT1 and the a-Si TFT2 are equal including the photodegradation characteristic. However, the speed of progress of photodegradation in the a-Si TFT1 is different from that in the a-Si TFT2 since a filter 3 is provided. Outside light (environmental light) to be detected is irradiated to both the a-Si TFT1 and the a-Si TFT2. The environmental light is incident on a channel portion of the a-Si TFT2 without any loss but the amount of light incident on a channel portion of the a-Si TFT1 is reduced to 1/10 due to the filter 3 that covers the channel portion of the a-Si TFT1. Thus, the filter 3 is a dark filter having a transmittance of 10% and reduces the incident light amount of the a-Si TFT1 to 1/10 of that of the a-Si TFT2.

In addition, switches SW1 and SW2 are controlled by the same switching signal. That is, timing when the switches SW1 and SW2 switch from OFF to ON or from ON to OFF is the same. In the case of measuring voltages of capacitors C1 and C2 are measured, the switches SW1 and SW2 are turned off after turning on the switches SW1 and SW2 to apply a voltage Vs to the capacitors C1 and C2 and then voltage values of the capacitors C1 and C2 are measured at a point of time when the reference time $t_0$ set beforehand has elapsed.

Figure 5:
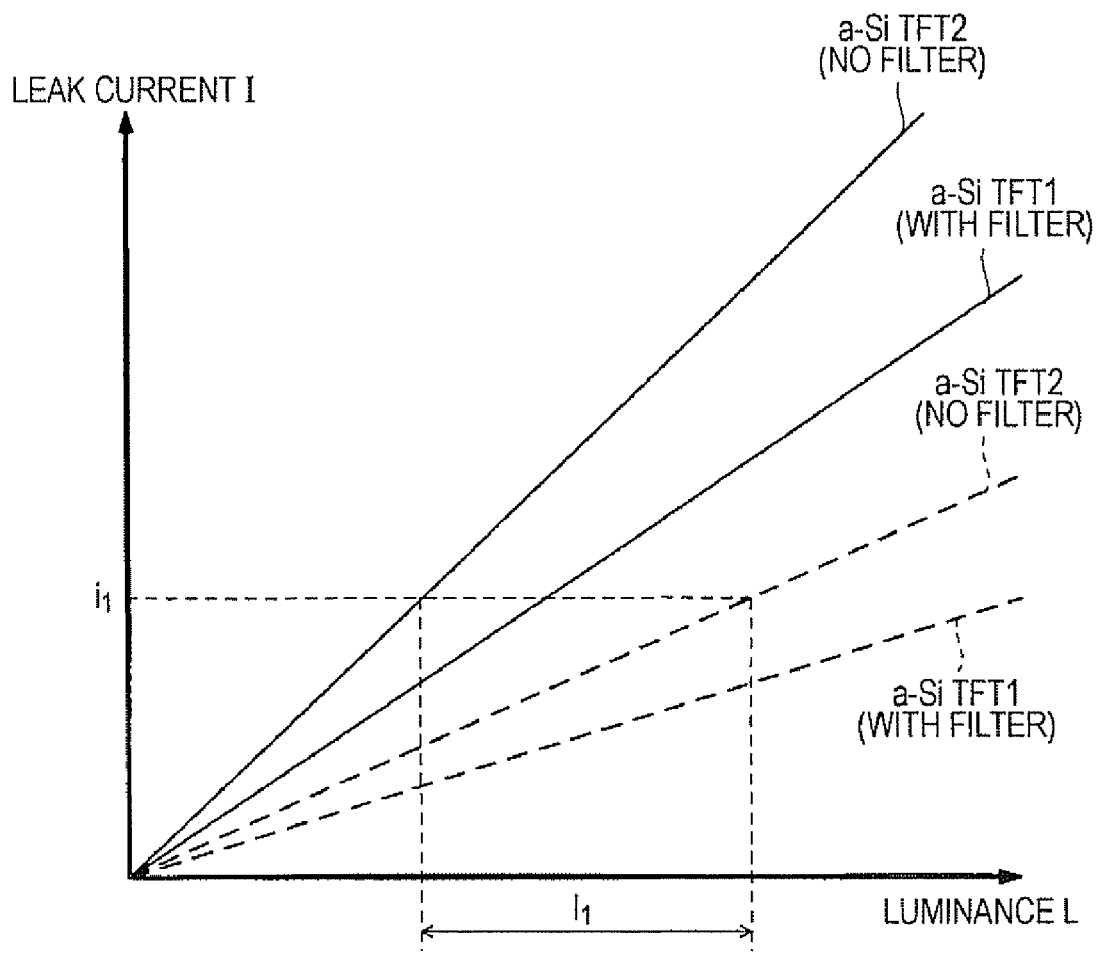
FIG. 5 is a graph illustrating the relationship between the luminance and a leak current in a-Si TFTs.

Here, the relationship between the intensity (luminance) of light incident on a channel portion and a leak current in the a-Si TFT1 and the a-Si TFT2 is shown in a graph of FIG. 5. In cases of the a-Si TFT1 and the a-Si TFT2, a dark current hardly flows as shown in FIG. 1. Accordingly, the relationship between a luminance L and a leak current I can be expressed as a linear equation with intercept of 0. In FIG. 5, characteristic lines of the a-Si TFT1 (with a filter) and the a-Si TFT2 (with no filter) in an initial state with no photodegradation are shown in solid lines, but each of the characteristic lines changes to be shown in a dotted line due to photodegradation. Accordingly, for example, if a rate of photodegradation (degree of degradation of photoelectric conversion efficiency) of the a-Si TFT1 is not known even if a measurement value $i_1$ of a leak current of the a-Si TFT1 is obtained, a luminance $l_1$ at this time is not fixed. As a result, an accurate luminance cannot be detected. The same is true for the a-Si TFT2.

Figure 6:
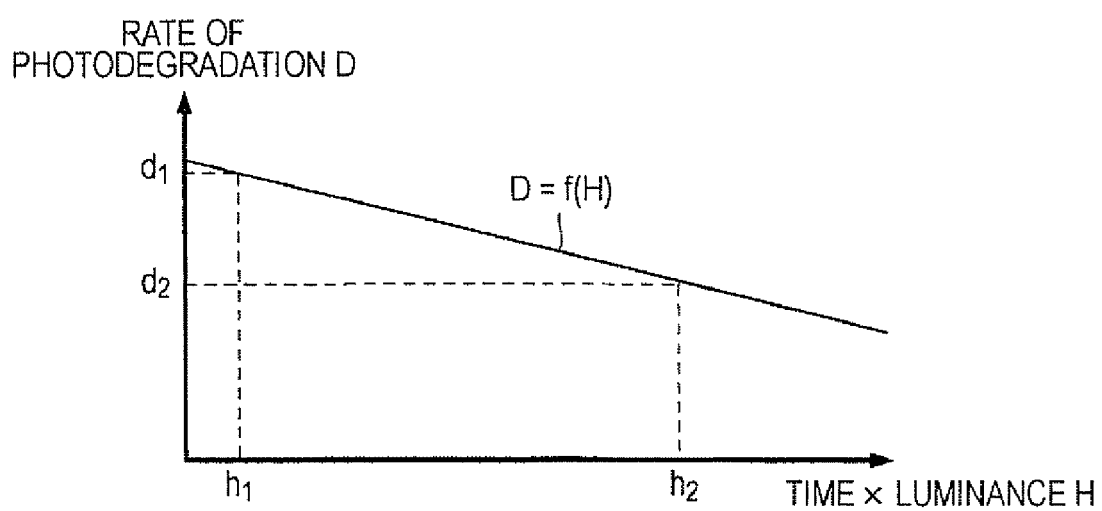
FIG. 6 is a graph illustrating the relationship between the integrated luminance and a rate of photodegradation in a-Si TFTs.

Furthermore, the relationship between an integrated luminance (luminance×period) H and a rate of photodegradation D in the a-Si TFT1 and the a-Si TFT2 is shown in a graph of FIG. 6. In addition, the rate of photodegradation shown in the drawing is obtained by normalizing a leak current value. The same a-Si TFTs are used as the a-Si TFT1 and the a-Si TFT2 and the incident light amount of the a-Si TFT1 is reduced to 1/10 of that of the a-Si TFT2. Accordingly, the integrated luminance of the a-Si TFT1 is always 1/10 of that of the a-Si TFT2. That is, the speed of the progress of photodegradation of the a-Si TFT1 is 1/10 of that of the a-Si TFT2. Accordingly, the characteristics shown in FIG. 6 are the same for the a-Si TFT1 and the a-Si TFT2. In addition, as is apparent from the graph, the rate of photodegradation of each of the a-Si TFT1 and the a-Si TFT2 is set as the unique value with respect to the integrated luminance.

Here, assuming that the luminance of environmental light incident on the filter 3 and the a-Si TFT2 is L, the relationship between the luminance (luminance of environmental light incident on the filter 3) and a leak current of the a-Si TFT1 in an initial state without photodegradation shown in FIG. 5 can be expressed in Equation 1. Similarly, the relationship between the luminance and a leak current of the a-Si TFT2 in an initial state without photodegradation can be expressed in Equation 2. In addition, a constant $a_1$ is a slope of the linear equation that defines the relationship between the luminance and a leak current of the a-Si TFT1 in an initial state without photodegradation. Similarly, a constant $a_2$ is a slope of the linear equation that defines the relationship between the luminance and a leak current of the a-Si TFT2 in an initial state without photodegradation.

$$I_1 = a_1 \times L \tag{1}$$

$$I_2 = a_2 \times L \tag{2}$$

In addition, as shown in FIG. 5, the characteristic lines indicating the relationship between the luminance and the leak current change to be shown in a dotted line due to photodegradation. Accordingly, the relationship between the luminance (luminance of environmental light incident on the filter 3) and a leak current of the a-Si TFT1 when photodegradation occurs can be expressed in Equation 3. Similarly, the relationship between the luminance and a leak current of the a-Si TFT2 when photodegradation occurs can be expressed in Equation 4.

$$I_1' = a_1' \times L \tag{3}$$

$$I_2' = a_2' \times L \tag{4}$$

Here, the relationships between the integrated luminance H and the rate of photodegradation D shown in FIG. 6 can be expressed in approximate equation of Equation 5. In addition, as described above, the integrated luminance of the a-Si TFT1 is always 1/10 of that of the a-Si TFT2. Therefore, a rate of photodegradation $d_1$ of the a-Si TFT1 can be expressed in Equation 6, and a rate of photodegradation $d_2$ of the a-Si TFT2 can be expressed in Equation 7.

$$D = f(H) \tag{5}$$

$$d_1 = f(h_1) \tag{6}$$

$$d_2 = f(h_2) = f(10 h_1) \tag{7}$$

In addition, the constant $a_1'$ in Equation 3 changes in proportion to the rate of photodegradation $d_1$. Similarly, the constant $a_2'$ in Equation 4 changes in proportion to the rate of photodegradation $d_2$. As a result, the constant $a_1'$ can be expressed in Equation 8, and the constant $a_2'$ can be expressed in Equation 9.

$$a_1' = a_1 \times d_1 = a_1 \times f(h_1) \tag{8}$$

$$a_2' = a_2 \times d_2 = a_2 \times f(h_2) = a_2 \times f(10 h_1) \tag{9}$$

Accordingly, the luminance $l_1$ (luminance of environmental light incident on the filter 3) of the a-Si TFT1 can be calculated by Equation 10 when a measurement value of a leak current of the a-Si TFT1 is $i_1'$. Similarly, the luminance $l_2$ of the a-Si TFT2 can be calculated by Equation 11 when a measurement value of a leak current of the a-Si TFT2 is $i_2'$. Therefore, a luminance difference DIF between the luminance $l_1$ of the a-Si TFT1 calculated by Equation 10 and the luminance $l_2$ of the a-Si TFT2 calculated by Equation 11 is expressed in Equation 12.

$$l_1 = \frac{i_1'}{a_1'} = \frac{i_1'}{a_1 \times d_1} = \frac{i_1'}{a_1 \times f(h_1)} \tag{10}$$

$$l_2 = \frac{i_2'}{a_2'} = \frac{l_2'}{a_2 \times d_2} = \frac{i_2'}{a_2 \times f(h_2)} \tag{11}$$

$$DIF = |l_1 - l_2| = \left| \frac{i_1'}{a_1 \times d_2} - \frac{i_2'}{a_2 \times d_2} \right| \tag{12}$$

Here, the relationship between the integrated luminance and the rate of photodegradation shown in FIG. 6 is the same in the a-Si TFT1 and the a-Si TFT2 and can be figured out beforehand. Accordingly, the relationship between the integrated luminance and the rate of photodegradation can be stored in a memory beforehand as profile data 4 of integrated luminance—rate of photodegradation shown in FIG. 7, for example. In addition, in the profile data 4 of integrated luminance—rate of photodegradation shown in the drawing, ADD (Hex) is a storage address (hexadecimal) of a memory. In addition, d(Dec) is a rate of photodegradation at the time of expression in decimals and d(Hex) is a rate of photodegradation at the time of expression in hexadecimals. However, it is not necessary to store the rate of photodegradation D(Dec) in an actual memory. Moreover, in the case when the transmittance of the filter 3 is 10%, a value of the integrated luminance h is calculated by logarithmic transformation (h=1, 2, 3, . . . 9, 10, 20 and 30, . . . , 90, 100, 200, 300 . . . ) and a value of the rate of photodegradation d(Hex) corresponding to each of the above values is registered as shown in FIG. 7. With this configuration, the amount of a memory used can be reduced since it is not necessary to register any useless value of the rate of photodegradation d.

Moreover, in FIG. 7, in order to make the invention easily understood, a reduction rate of the rate of photodegradation D to the integrated luminance h is set larger than that in an actual case. In the following description, it is assumed that the value of d(Dec) is used as a rate of photodegradation.

Referring to the profile data 4 of integrated luminance—rate of photodegradation, for example, assuming that a value of the rate of photodegradation $d_1$ of the a-Si TFT1 is '1.000' that is a value of the rate of photodegradation d(Dec) when the integrated luminance h is '1', a value of the rate of photodegradation $d_2$ of the a-Si TFT2 at this time can be specified as '0.950' that is a value of the rate of photodegradation d(Dec) when the integrated luminance h is '10'. In addition, assuming that a value of the rate of photodegradation di of the a-Si TFT1 is '0.985' that is a value of the rate of photodegradation d(Dec) when the integrated luminance h is '2', a value of the rate of photodegradation $d_2$ of the a-Si TFT2 at this time can be specified as '0.935' that is a value of the rate of photodegradation d(Dec) when the integrated luminance h is '20'. That is, referring to the profile data 4 of integrated luminance—rate of photodegradation shown in FIG. 7, for example, assuming that values of the integrated luminance h of the a-Si TFT1 are '1', '2', '3', . . . , a set of a value of the rate of photodegradation $d_1$ of the a-Si TFT1 and a value of the rate of photodegradation $d_2$ of the a-Si TFT2 at that time can be specified for every value of the integrated luminance h assumed.

In addition, when calculating the luminance difference DIF for every set specified as described above by substituting values of the specified rates of photodegradation $d_1$ and $d_2$, values of leak currents $i_1'$ and $i_2'$ obtained by measurement, and the constants $a_1$ and $a_2$ into Equation 12 and specifying a luminance difference $DIF_{MIN}$ corresponding to a minimum value (ideally 0) among the calculated luminance differences DIF, $d_1$ and $d_2$ used when calculating the luminance difference $DIF_{MIN}$ become rates of photodegradation of the a-Si TFT1 and a-Si TFT2, respectively, at this point in time. Accordingly, by substituting the rate of photodegradation $d_2$ that is thus specified into Equation 13, the luminance L of environmental light can be accurately detected even if the conductivities of the a-Si TFT1 and the a-Si TFT2 are reduced due to photodegradation.

$$L = \frac{i_2'}{a_2 \times d_2} \tag{13}$$

Figure 4:
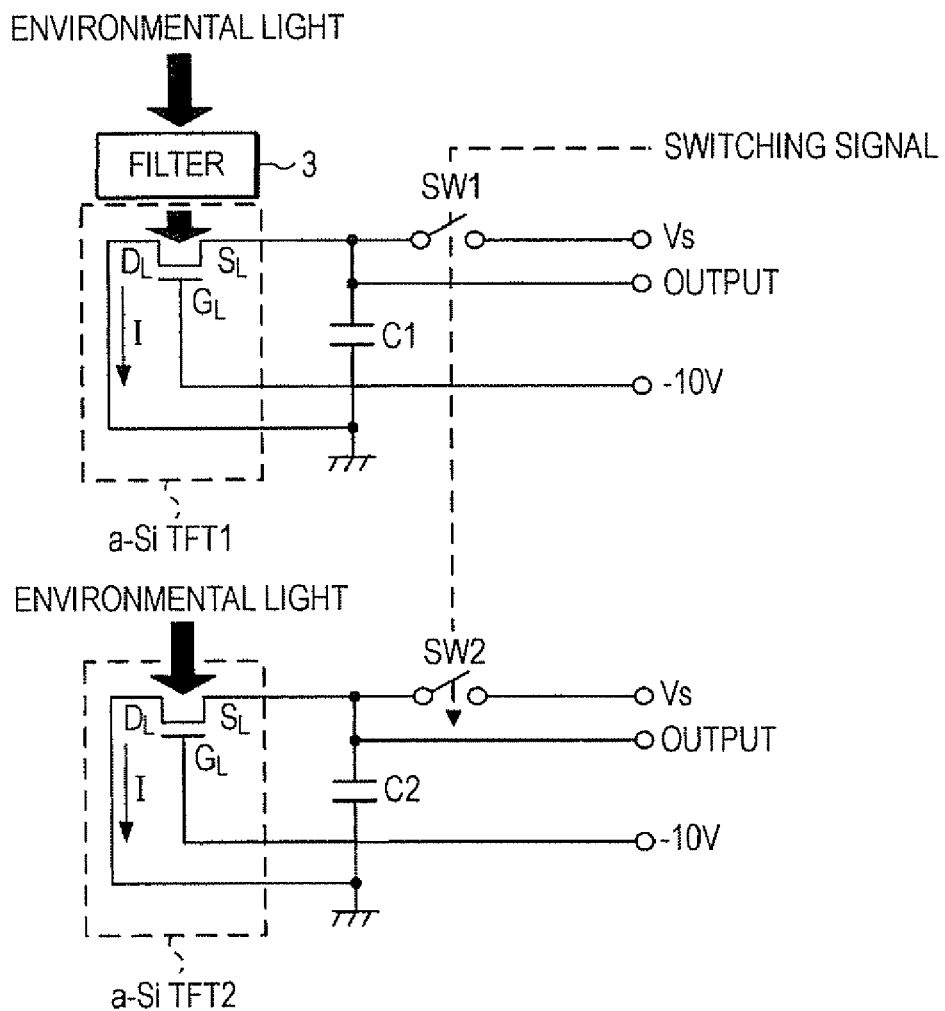
FIG. 4 is a circuit diagram illustrating the configuration of an optical sensor circuit.
Figure 8:
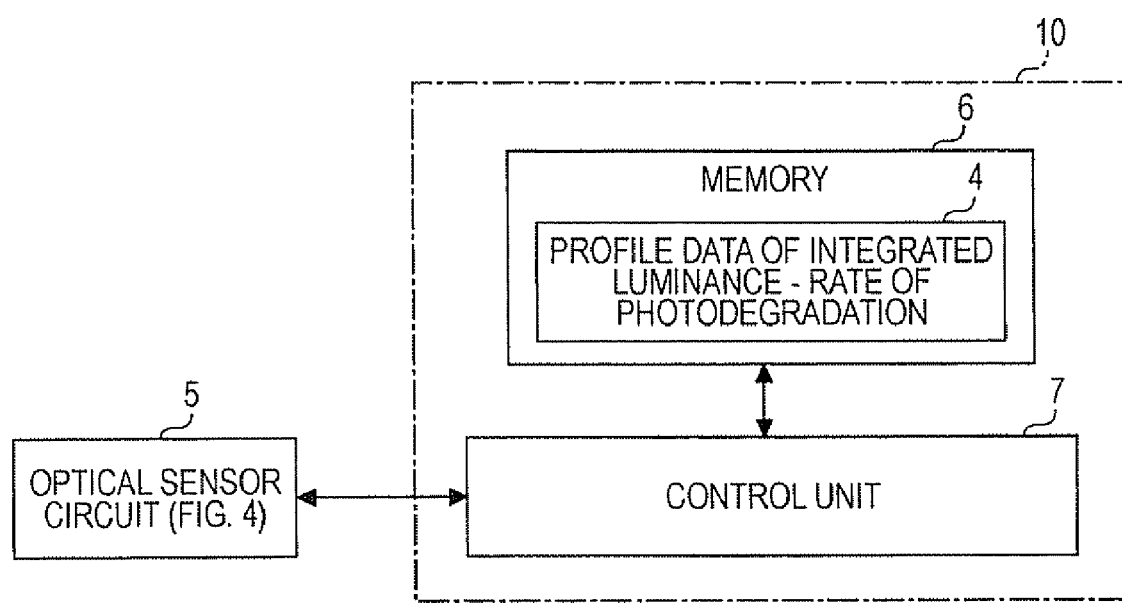
FIG. 8 is a block diagram illustrating the entire configuration of an optical sensor circuit and an optical detection circuit.

FIG. 8 is a block diagram illustrating the entire configuration of the optical sensor circuit 5 and the optical detection circuit 10 according to the present embodiment. The optical detection circuit 10 includes: a memory 6 that stores the profile data 4 of integrated luminance—rate of photodegradation shown in FIG. 7; and a control unit 7 that has a CPU, a ROM, and the like and calculates the luminance L of environmental light on the basis of a result of measurement in the optical sensor circuit 5 of which the circuit configuration is shown in FIG. 4, and the profile data 4 of integrated luminance—rate of photodegradation.

Figure 9:
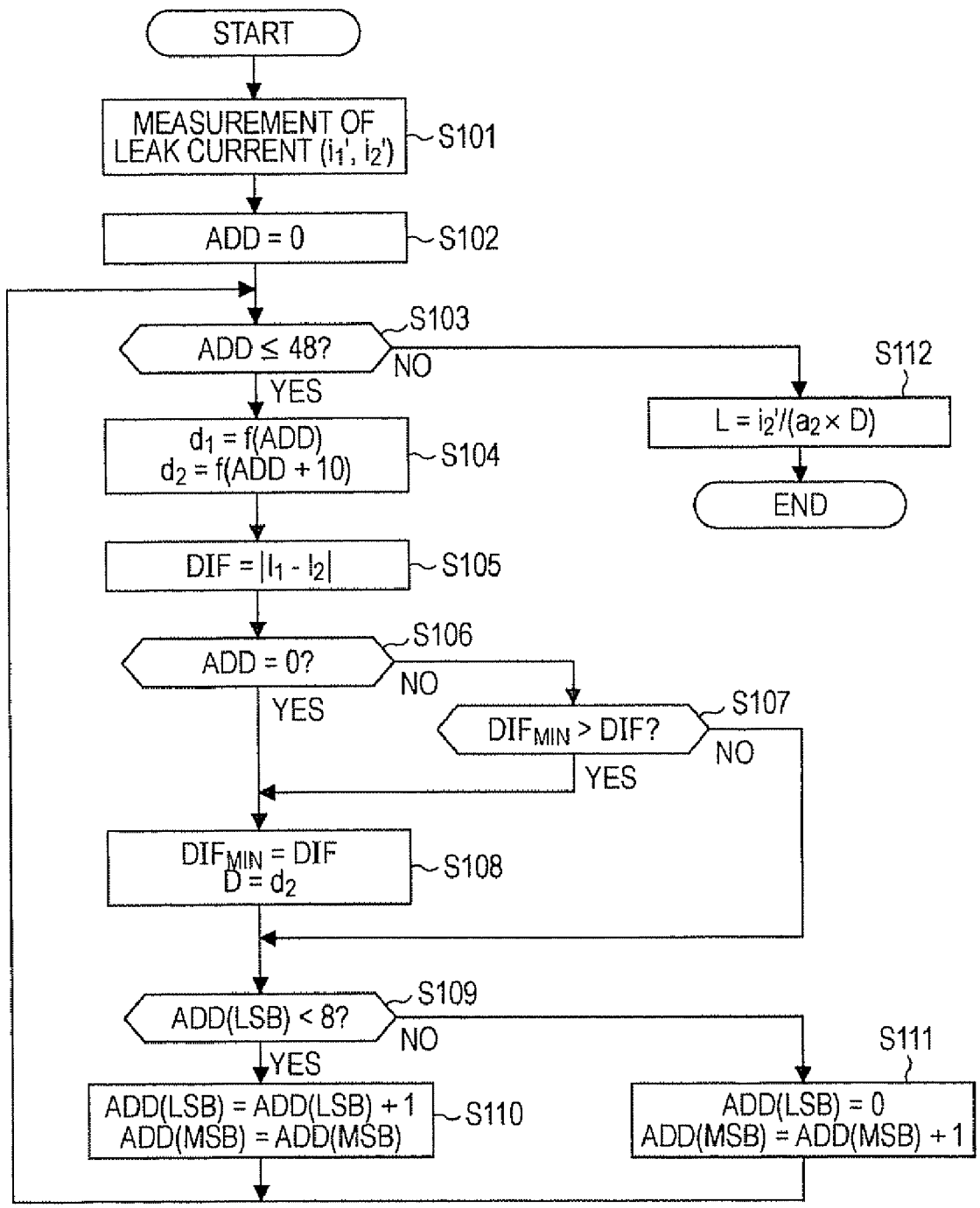
FIG. 9 is a flow chart illustrating luminance detection processing executed by a control unit.

FIG. 9 is a flow chart illustrating luminance detection processing executed by the control unit 7. As shown in the drawing, the control unit 7 first measures the leak current $i_1'$ of the a-Si TFT1 and the leak current $i_2'$ of the a-Si TFT2 (step S101). Then, the control unit 7 sets a value of the storage address ADD when referring to the profile data 4 of integrated luminance—rate of photodegradation to '0' (step S102). Then, the control unit 7 determines whether or not the value of the storage address ADD is equal to or smaller than '48' (step S103). If the value of the storage address ADD is larger than '48', the process proceeds to step S112. Furthermore, in an initial phase, a value of the storage address ADD is set to '0' in step S102. Accordingly, the determination result in step S103 is YES, proceeding to step S104.

Then, in step S104, the control unit 7 reads the rates of photodegradation $d_1$ and $d_2$ from the profile data 4 of integrated luminance—rate of photodegradation (refer to FIG. 7) according to the value of the storage address ADD. For example, when the value of the storage address ADD is '0', '1.000' that is a value of d(Dec) is read as a value of the rate of photodegradation $d_1$. In addition, a value of the rate of photodegradation d2 is read after adding '10' to the value of the storage address ADD. That is, when the value of the storage address ADD is '0', '0.950' that is a value of d(Dec) is read as the value of the rate of photodegradation $d_2$.

Then, the control unit 7 calculates the luminance difference DIF by substituting the values of the rates of photodegradation $d_1$ and $d_2$ read in step S104, the values of leak currents $i_1'$ and $i_2'$ measured in step S101, and the constants $a_1$ and $a_2$ into Equation 12 (step S105). Then, the control unit 7 determines whether or not the value of the storage address ADD is '0'

(step S106). When it is determined that the value of the storage address ADD is '0', the control unit 7 proceeds to step S108 to store the value of the luminance difference DIF calculated in step S105 as the luminance difference $DIF_{MIN}$ (provisional) and the value $d_2$ read in step S104 as the rate of photodegradation D (provisional) of the a-Si TFT2 in the memory 6.

In addition, when the determination result in step S106 is NO, that is, when the value of the storage address ADD is in a range of '1' to '48', the control unit 7 compares the value of the luminance difference $DIF_{MIN}$ (provisional), which is already stored in the memory, with a value of the luminance difference DIF calculated this time in step S105 (step S107). As a result, if the value of the luminance difference DIF calculated this time is smaller, the process proceeds to step S108. In addition, the control unit 7 overwrites the value of the luminance difference $DIF_{MIN}$ (provisional), which is stored in the memory 6, with the value of the luminance difference DIF calculated this time and overwrites the value of the rate of photodegradation D (provisional) stored in the memory 6 with the value of $d_2$ read this time in step S104. On the other hand, when the determination result in step S107 is NO, the control unit 7 proceeds to step S109 without overwriting the value of the luminance difference $DIF_{MIN}$ (provisional) and the value of the rate of photodegradation D (provisional) stored in the memory 6.

Thereafter, in step S109-S111, processing for advancing the value of the storage address ADD is performed. As shown in FIG. 7, the profile data 4 of integrated luminance—rate of photodegradation is configured to set the integrated luminance h with respect to the storage address ADD as expressed in Equation 14 and store a corresponding rate of photodegradation.

$$h=\{ADD(LSB)+1\}\times 10^{ADD(MSB)} \quad (14)$$

Accordingly, the control unit 7 first determines whether or not an LSB of the storage address ADD is smaller than '8' (step S109). If it is determined that the LSB is smaller than '8', the control unit 7 increments only the LSB of the storage address ADD (step S110). On the other hand, if the LSB is '8', the control unit 7 sets the LSB of the storage address ADD to '0' and increments an MSB (step S111). The control unit 7 returns to step S103 after performing processing for advancing the value of the storage address ADD as described above.

Thus, the control unit 7 repeats processing in steps S103 to S111 until the value of the storage address ADD exceeds '48'. As a result, a plurality of sets of rates of photodegradation $d_1$ and $d_2$ are specified with reference to the profile data 4 of integrated luminance—rate of photodegradation and a value of the luminance difference DIF is calculated for every specified set. Moreover, the value of the luminance difference $DIF_{MIN}$, which is a minimum value among the luminance differences DIF calculated in such a manner, and the value (rate of photodegradation D) of $d_2$ used when the luminance difference $DIF_{MIN}$ is calculated are stored in the memory 6.

Then, when the value of the storage address ADD exceeds '48', the control unit 7 proceeds to step S112 to first read the value of the rate of photodegradation D stored in the memory 6. Then, the control unit 7 calculates the luminance L of environmental light by substituting the read value of the rate of photodegradation D, the value of the leak current $i_2'$ of the a-Si TFT2 measured in step S101, and the value of the constant $a_2$ into Equation 13. In addition, the value of the rate of photodegradation D is substituted as $d_2$ into Equation 13.

Thus, according to the present embodiment, since the a-Si TFT1 and the a-Si TFT2 having the same photoelectric conversion characteristic are used and the progress of photodegradation in the a-Si TFT1 is delayed due to the filter 3, the rate of photodegradation $d_2$ of the a-Si TFT2 can be specified on the basis of the measurement values $i_1'$ and $i_2'$ of leak currents of the a-Si TFT1 and the a-Si TFT2 and the profile data 4 of integrated luminance—rate of photodegradation stored in the memory 6. Therefore, by calculating the luminance L of environmental light using the rate of photodegradation $d_2$ specified in such a manner, the measurement value $i_2'$ of a leak current of the a-Si TFT2, and the constant $a_2$, the luminance L of environmental light can be accurately detected even if the conductivities of the a-Si TFT1 and the a-Si TFT2 are reduced due to photodegradation.

In addition, a configuration in which Equation 5 is stored in the memory 6 instead of the profile data 4 of integrated luminance—rate of photodegradation may also be adopted. Since Equation 5 is a function that defines the relationship between the integrated luminance and the rate of photodegradation, the set of rates of photodegradation $d_1$ and $d_2$ used when calculating the luminance difference DIF can be specified on the basis of Equation 5 and a light reduction rate of the filter 3. In this case, since the profile data 4 of integrated luminance—rate of photodegradation does not need to be stored in the memory 6, the amount of the memory 6 used can be reduced.

Furthermore, in the above luminance detection processing, a case in which the luminance L of environmental light is calculated by using the rate of photodegradation $d_2$ of the a-Si TFT2 used when the luminance difference $DIF_{MIN}$ is calculated, the measurement value $i_2'$ of a leak current of the a-Si TFT2, and the constant $a_2$ has been described. However, the luminance L of environmental light may also be calculated by using the rate of photodegradation $d_1$ of the a-Si TFT1 used when the luminance difference $DIF_{MIN}$ is calculated, the measurement value $i_1'$ of a leak current of the a-Si TFT1, the constant $a_1$, and the light reduction rate of the filter 3. In this case, however, the value of the rate of photodegradation $d_1$ of the a-Si TFT1 used when the luminance difference $DIF_{MIN}$ is calculated needs to be stored in the memory 6 in addition to the value of the light reduction rate of the filter 3.

Furthermore, in the present embodiment, a case in which the luminance L of environmental light is calculated by using the measurement values $i_1'$ and $i_2'$ of a leak current has been described. However, the luminance L of environmental light may also be calculated by measuring voltage values $v_1'$ and $v_2'$ of the capacitors C1 and C2 in the circuit shown in FIG. 4 at a point of time when the reference time $t_0$ has elapsed after turning off the switches SW1 and SW2 and then using the voltage values $v_1'$ and $v_2'$ and the rate of photodegradation. In this case, however, profile data indicating the relationship between the luminance of the a-Si TFT1 and the voltage value of the capacitor C1 at a point of time when the reference time $t_0$ has elapsed or profile data indicating the relationship between the luminance of the a-Si TFT2 and the voltage value of the capacitor C2 at a point of time when the reference time $t_0$ has elapsed needs to be stored in the memory 6.

2. Second Embodiment

The case in which the dark filter having a transmittance of 10% is used as the filter 3 has been described in the first embodiment, while a case in which a green color filter is used as the filter 3 will be described in the present embodiment. Moreover, in the present embodiment, the same constituent elements as in the first embodiment are denoted by the same reference numerals, and an explanation thereof will be omitted.

Figure 10:
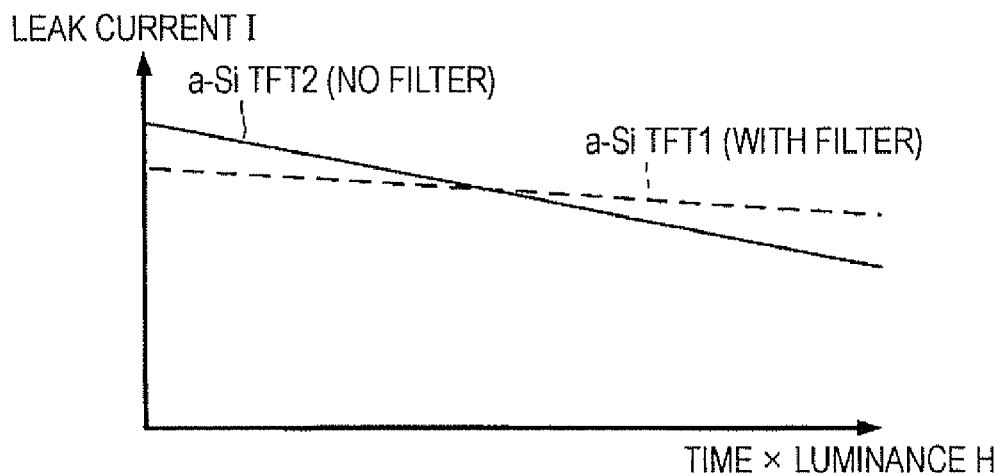
FIG. 10 is a graph illustrating the relationship between the luminance and a leak current in a-Si TFTs according to a second embodiment of the invention.
Figure 11:
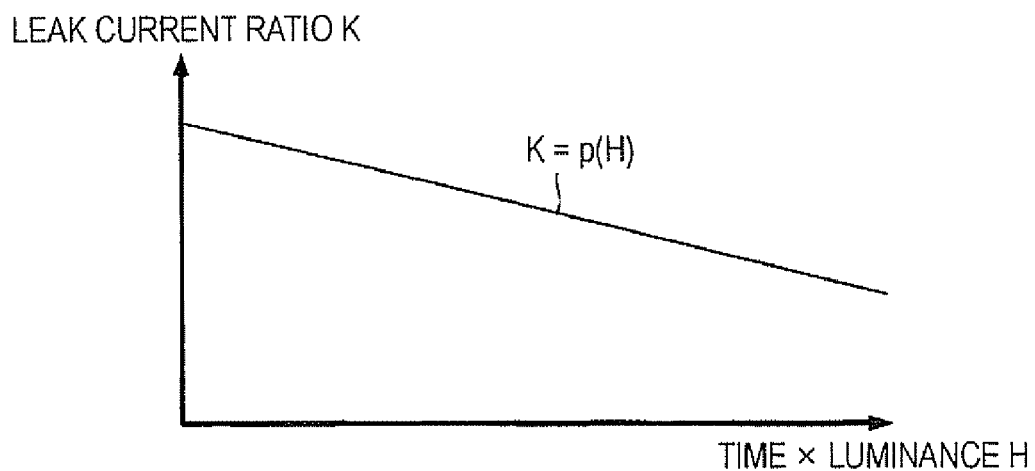
FIG. 11 is a graph illustrating the relationship between a leak current ratio and the integrated luminance in a-Si TFTs.

An optical sensor circuit in the present embodiment includes the circuit shown in FIG. 4, in the same manner as that in the first embodiment. However, the second embodiment is different from the first embodiment in that a green color filter is used as the filter 3 and the incident light amount of the a-Si TFT1 is smaller than that of the a-Si TFT2 due to the green color filter. In the case where a green color filter is used as the filter 3 as described above, the relationship between an integrated luminance and a leak current in an a-Si TFT1 and an a-Si TFT2 is shown in a graph of FIG. 10. Due to a difference in integrated luminance caused by the existence of a green color filter, a slope of a characteristic line of the a-Si TFT1 (with a filter) is different from that of the a-Si TFT2 (with no filter). In addition, assuming that a ratio between a leak current of the a-Si TFT1 and a leak current of the a-Si TFT2 is K, the relationship between the leak current ratio K and the integrated luminance is shown in a graph of FIG. 11 and can be expressed with Equation 15.

$$K = p(H) \quad (15)$$

Here, assuming that a measurement value of the leak current of the a-Si TFT1 is $i_1'$ and a measurement value of the leak current of the a-Si TFT2 is $i_2'$, a leak current ratio kmsg obtained from the measurement values is expressed in Equation 16. In addition, the relationship between the leak current ratio K and a rate of photodegradation of the a-Si TFT2 (with no filter) can be expressed in approximate equation of Equation 17 and is shown in a graph of FIG. 12. In addition, the rate of photodegradation shown in FIG. 12 is obtained by normalizing a leak current value.

$$kmsg = i_2'/i_1' \quad (16)$$

$$D = g(K) \quad (17)$$

Figure 12:
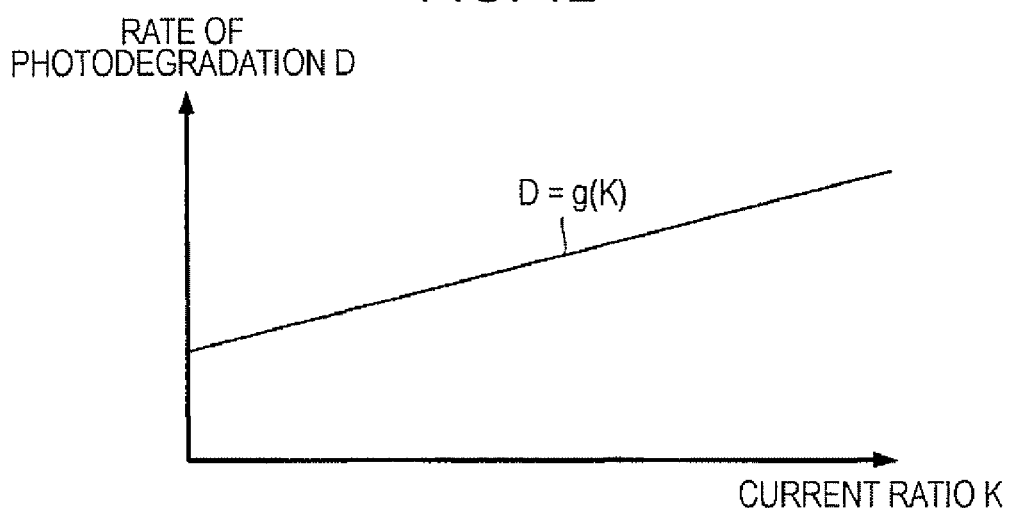
FIG. 12 is a graph illustrating the relationship between a leak current ratio of a-Si TFTs and a rate of photodegradation of the a-Si TFT.

Here, the relationship between the leak current ratio K and the rate of photodegradation of the a-Si TFT2 shown in FIG. 12 can be figured out beforehand. Accordingly, the relationship between the leak current ratio K and the rate of photodegradation of the a-Si TFT2 can be stored in a memory, for example, as profile data 14 of leak current ratio—rate of photodegradation shown in FIG. 13. In addition, in the profile data 14 of leak current ratio—rate of photodegradation shown in the drawing, ADD(Hex) is a storage address (hexadecimal) of a memory. In addition, k(Dec) is a leak current ratio at the time of expression in decimals and k(Hex) is a leak current ratio at the time of expression in hexadecimals. Similarly, d(Dec) is a rate of photodegradation at the time of expression in decimals and d(Hex) is a rate of photodegradation of the a-Si TFT2 at the time of expression in hexadecimals.

However, in an actual memory, only the leak current ratio k(hex) and the rate of photodegradation d(Hex) are preferably stored for every value of the storage address ADD without the need of storing the leak current ratio k(Dec) and the rate of photodegradation d(Dec) in the memory. Moreover, in FIG. 13, in order to make the invention easily understood, a reduction rate of the rate of photodegradation d is made larger than that in an actual case. In the following description, it is assumed that a value of k(Dec) as a leak current ratio and a value of d(Dec) as a rate of photodegradation are used.

A difference between each of all leak current ratios k, which are stored in the profile data 14 of leak current ratio—rate of photodegradation, and the leak current ratio kmsg obtained from a measurement value is calculated by using Equation 18 and the leak current ratio k, which causes the difference DIF to become a minimum value (ideally 0), is specified. Then, the rate of photodegradation d that is stored in the profile data 14 so as to correspond to the leak current ratio k becomes a rate of photodegradation of the a-Si TFT2 at this point in time. Accordingly, by substituting the rate of photodegradation d thus specified into Equation 13 as $d_2$, the luminance L of environmental light can be accurately detected even if the conductivities of the a-Si TFT1 and the a-Si TFT2 are reduced due to photodegradation.

$$DIF = |kmsg - k| \quad (18)$$

Figure 14:
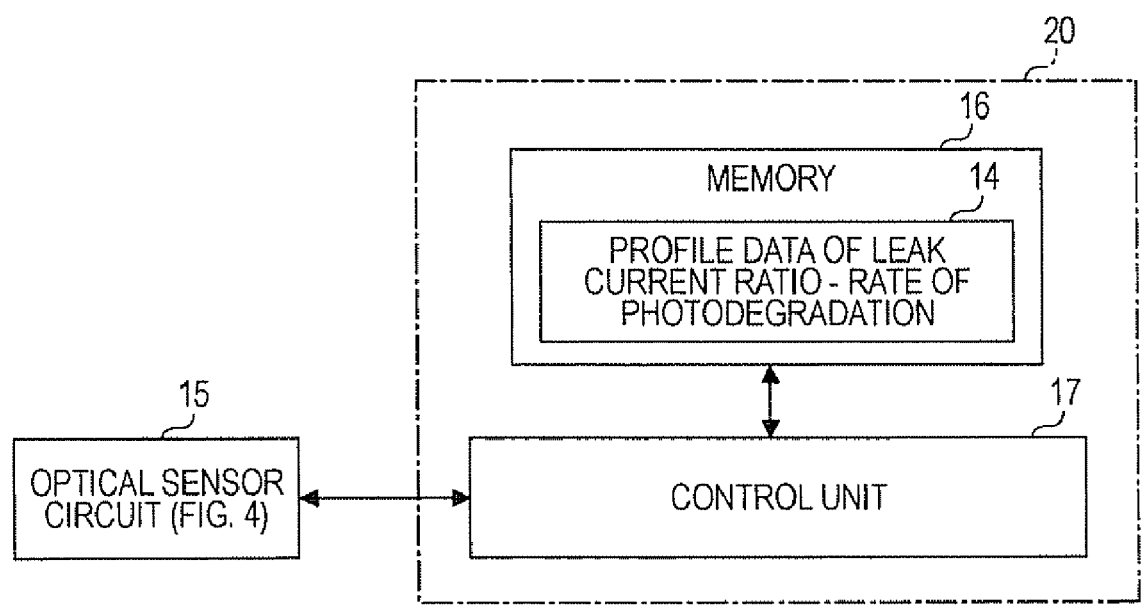
FIG. 14 is a block diagram illustrating the entire configuration of an optical sensor circuit and an optical detection circuit.

FIG. 14 is a block diagram illustrating the entire configuration of the optical sensor circuit 15 and the optical detection circuit 20 according to the present embodiment. The optical detection circuit 20 includes: a memory 16 that stores the profile data 14 of leak current ratio—rate of photodegradation shown in FIG. 13; and a control unit 17 that has a CPU, a ROM, and the like and calculates the luminance L of environmental light on the basis of a result of measurement in the optical sensor circuit 15 (which uses a green color filter as the filter 3), of which the circuit configuration is shown in FIG. 4, and the profile data 14 of leak current ratio—rate of photodegradation.

Figure 15:
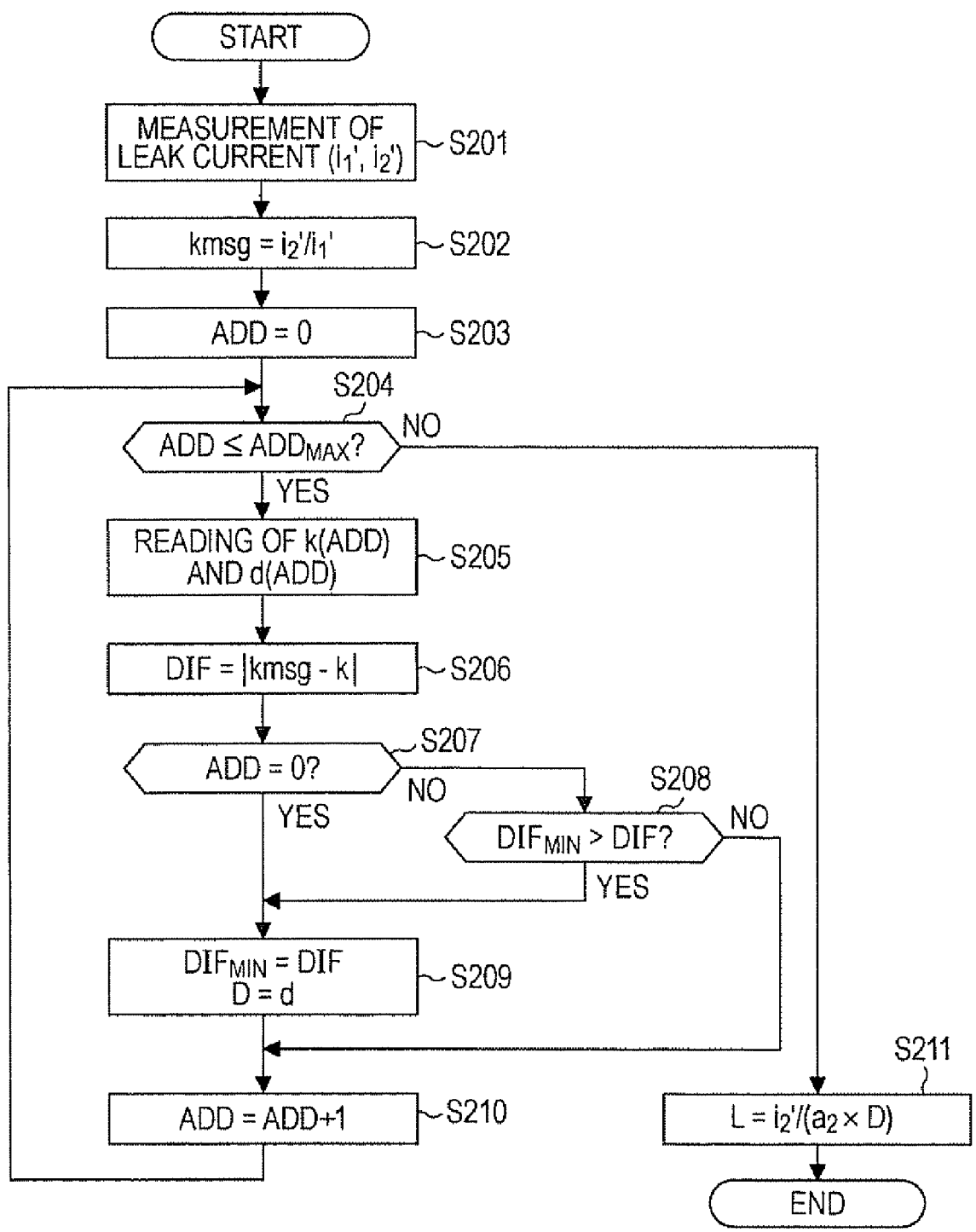
FIG. 15 is a flow chart illustrating luminance detection processing executed by a control unit.

FIG. 15 is a flow chart illustrating luminance detection processing executed by the control unit 17. As shown in the drawing, the control unit 17 first measures the leak current $i_1'$ of the a-Si TFT1 and the leak current $i_2'$ of the a-Si TFT2 (step S201). Then, the control unit 17 calculates the leak current ratio kmsg using the measured leak currents $i_1'$ and $i_2'$ (step S202). Then, the control unit 17 sets a value of the storage address ADD when referring to the profile data 14 of leak current ratio—rate of photodegradation to '0' (step S203). Then, the control unit 17 determines whether or not the value of the storage address ADD is smaller than a maximum value $ADD_{MAX}$ set beforehand (step S204). If the value of the storage address ADD is equal to or larger than the maximum value $ADD_{MAX}$, the process proceeds to step S211. Furthermore, in an initial phase, a value of the storage address ADD is set to '0' in step S203. Accordingly, the determination result in step S204 is YES, proceeding to step S205.

Then, in step S205, the control unit 17 reads the leak current ratio k and the value of the rate of photodegradation d from the profile data 14 of leak current ratio—rate of photodegradation (refer to FIG. 13) according to the value of the storage address ADD. For example, when the value of the storage address ADD is '0', '10.83' that is a value of k(Dec) is read as a value of the leak current ratio k and '1.000' that is a value of d(Dec) is read as a value of rate of photodegradation d.

Then, the control unit 17 calculates the difference DIF between leak current ratios by substituting the value of the leak current ratio kmsg calculated in step S202 and the value of the leak current ratio k read in step S205 into Equation 18 (step S206). Then, the control unit 17 determines whether or not the value of the storage address ADD is '0' (step S207). When it is determined that the value of the storage address ADD is '0', the control unit 17 proceeds to step S209 to store the value of the difference DIF calculated in step S206 as a difference $DIF_{MIN}$ (provisional) and the value d read in step S205 as a rate of photodegradation D (provisional) of the a-Si TFT2 in the memory 16.

In addition, when the determination result in step S207 is NO, that is, the control unit 17 compares the value of the difference $DIF_{MIN}$ (provisional), which is already stored in the memory, with a value of the difference DIF calculated this time in step S206 (step S208). As a result, if the value of the difference DIF calculated this time is smaller, the process proceeds to step S209. In addition, the control unit 17 overwrites the value of the difference $DIF_{MIN}$ (provisional), which is stored in the memory 16, with the value of the difference DIF calculated this time and overwrites the value of the rate of photodegradation D (provisional) stored in the memory 16 with the value of d read this time in step S205. On the other hand, when the determination result in step S208 is NO, the control unit 17 proceeds to step S210 without overwriting the value of the difference $DIF_{MIN}$ (provisional) and the value of the rate of photodegradation D (provisional) stored in the memory 16.

Then, the control unit 17 increments of the value of the storage address ADD (step S210) and returns to step S204. Thus, the control unit 17 repeats processing in steps S204 to S210 until the value of the storage address ADD reaches the maximum value $ADD_{MAX}$. Then, the difference DIF between each of all leak current ratios k, which are stored in the profile data 14 of leak current ratio—rate of photodegradation, and the leak current ratio kmsg is calculated. Moreover, the value of the difference $DIF_{MIN}$, which is a minimum value among the differences DIF calculated in such a manner, and the rate of photodegradation D of the a-Si TFT2 at this time are stored in the memory 16.

Then, when the value of the storage address ADD reaches the maximum value $ADD_{MAX}$, the control unit 17 proceeds to step S211 to first read the rate of photodegradation D stored in the memory 16. Then, the control unit 17 calculates the luminance L of environmental light by substituting the read value of the rate of photodegradation D, the value of the leak current $i_2'$ of the a-Si TFT2 measured in step S201, and the value of the constant $a_2$ into Equation 13. In addition, the value of the rate of photodegradation D is substituted as d2 into Equation 13.

Thus, according to the present embodiment, since the a-Si TFT1 and the a-Si TFT2 having the same photoelectric conversion characteristic are used and the progress of photodegradation in the a-Si TFT1 is delayed due to the filter 3 (green color filter), the rate of photodegradation $d_2$ of the a-Si TFT2 can be specified on the basis of the measurement values $i_1'$ and $i_2'$ of leak currents of the a-Si TFT1 and the a-Si TFT2 and the profile data 14 of leak current ratio—rate of photodegradation stored in the memory 16. Therefore, by calculating the luminance L of environmental light using the rate of photodegradation $d_2$ specified in such a manner, the measurement value $i_2'$ of a leak current of the a-Si TFT2, and the constant $a_2$, the luminance L of environmental light can be accurately detected even if the conductivities of the a-Si TFT1 and the a-Si TFT2 are reduced due to photodegradation.

In addition, a configuration in which Equation 17 is stored in the memory 16 instead of the profile data 14 of leak current ratio—rate of photodegradation may also be adopted. Since Equation 17 is a function that defines the relationship between the leak current ratio and the rate of photodegradation of the a-Si TFT2 (with no green color filter), a value of the rate of photodegradation d and the leak current ratio k used when calculating the difference DIF between leak current ratios can be specified on the basis of Equation 17. In this case, since the profile data 14 of leak current ratio—rate of photodegradation does not need to be stored in the memory 16, the amount of the memory 16 used can be reduced.

Furthermore, in the above luminance detection processing (FIG. 15), a case in which the luminance L of environmental light is calculated by using the rate of photodegradation $d_2$ of the a-Si TFT2 used when the difference $DIF_{MIN}$ is calculated, the measurement value $i_2'$ of a leak current of the a-Si TFT2, and the constant $a_2$ has been described. However, in the case where the relationship between a leak current ratio and a rate of photodegradation of the a-Si TFT1 (with a green color filter) is registered in the profile data 14 of leak current ratio—rate of photodegradation shown in FIG. 13, the luminance L of environmental light may also be calculated by using the rate of photodegradation $d_1$ of the a-Si TFT1 when calculating the difference $DIF_{MIN}$, the measurement value $i_1'$ of the leak current of the a-Si TFT1, the constant $a_1$, and a light reduction rate of the filter 3. In this case, however, the value of the rate of photodegradation $d_1$ of the a-Si TFT1 used when the difference $DIF_{MIN}$ is calculated needs to be stored in the memory 16 in addition to the value of the light reduction rate of the filter 3.

Furthermore, in the present embodiment, a case in which the luminance L of environmental light is calculated by using the measurement values $i_1'$ and $i_2'$ of a leak current has been described. However, the luminance L of environmental light may also be calculated by measuring voltage values $v_1'$ and $v_2'$ of the capacitors C1 and C2 in the circuit shown in FIG. 4 at a point of time when the reference time $t_0$ has elapsed after turning off the switches SW1 and SW2 and then using the measurement values $v_1'$ and $v_2'$ and the rate of photodegradation. In this case, however, profile data indicating the relationship between the luminance of the a-Si TFT1 and the voltage value of the capacitor C1 at a point of time when the reference time to has elapsed or profile data indicating the relationship between the luminance of the a-Si TFT2 and the voltage value of the capacitor C2 at a point of time when the reference time $t_0$ has elapsed needs to be stored in the memory 16.

3. Third Embodiment

In the present embodiment, a display device that adjusts the brightness of the entire screen according to the luminance (ambient brightness) of environmental light by using the optical sensor circuit 5 and the optical detection circuit 10 described in the first embodiment or the optical sensor circuit 15 and the optical detection circuit 20 described in the second embodiment will be described.

Figure 16:
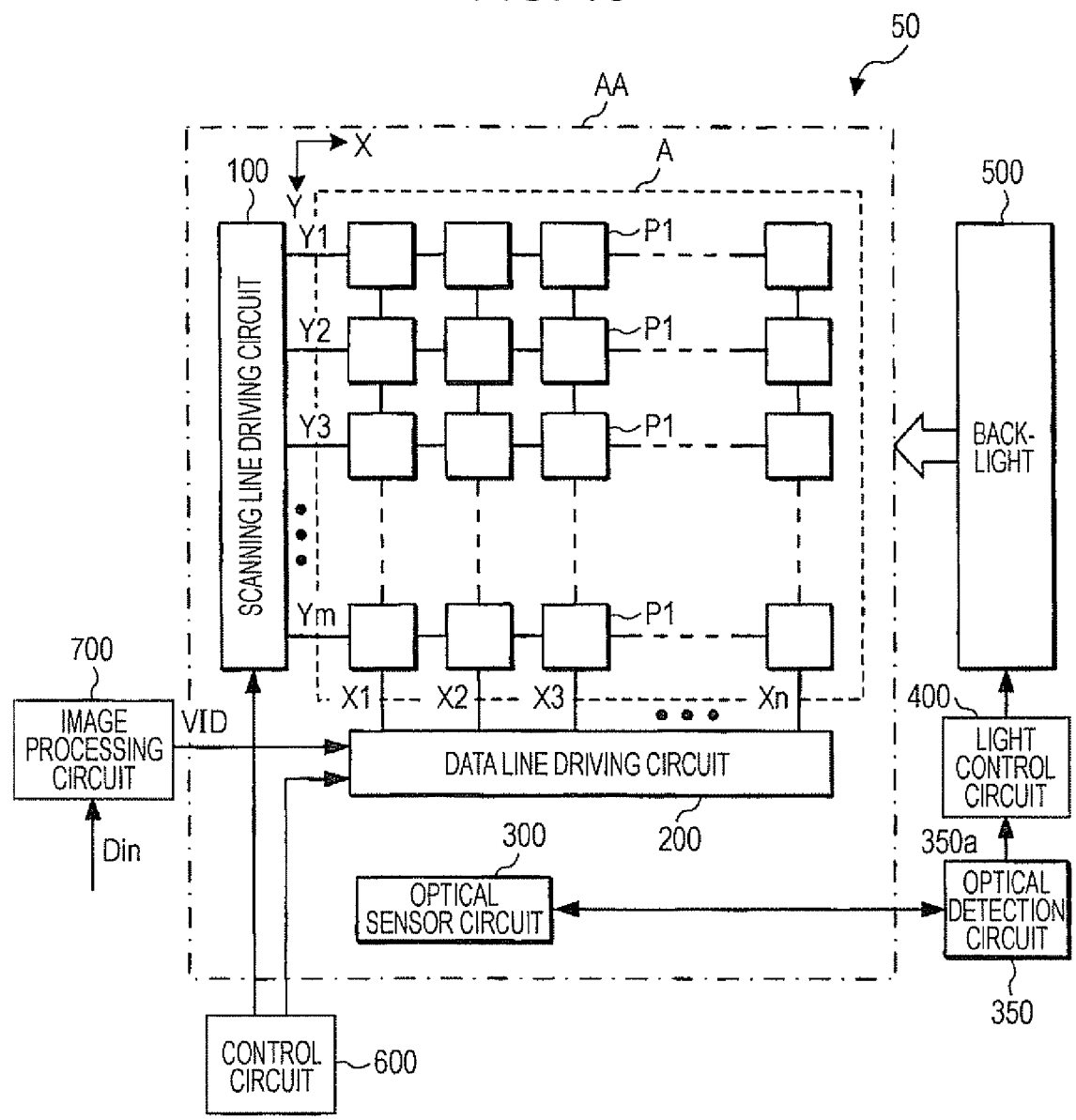
FIG. 16 is a block diagram illustrating the entire configuration of a display device according to a third embodiment of the invention.

FIG. 16 is a block diagram illustrating the configuration of a display device 50 according to the present embodiment. The display device 50 is a transmissive liquid crystal display device and includes a liquid crystal panel AA, an optical detection circuit 350, a light control circuit 400, a backlight 500, a control circuit 600, and an image processing circuit 700. In addition, an image display region A, a scanning line driving circuit 100, a data line driving circuit 200, and an optical sensor circuit 300 are provided in the liquid crystal panel AA. In the image display region A, 'm' scanning lines extending in the X direction and 'n' data lines extending in the Y direction are formed. In addition, a pixel circuit P1 is provided at the position corresponding to each intersection between the scanning line and the data line. Each pixel circuit P1 has an a-Si TFT as a switching element.

The scanning line driving circuit 100 selects the pixel circuits P1, which is arrayed in a matrix, in the unit of a row by using scanning signals Y1, Y2, Y3, . . . , Ym and operates the selected pixel circuits P1. On the other hand, the data line driving circuit 200 supplies data signals X1, X2, . . . , Xn to one row of pixel circuits P1 ('n' pixel circuits) selected by the scanning line driving circuit 100. The control circuit 600 outputs various kinds of control signals, such as a clock signal, to the scanning line driving circuit 100 and the data line driving circuit 200. In addition, the image processing circuit 700 performs gamma correction processing considering a light transmission characteristic of the liquid crystal panel AA on input image data Din and then generates an image signal VID by performing D/A conversion of image data corresponding to each color of RGB. Then, the image processing circuit 700 supplies the generated image signal VID to the data line driving circuit 200.

The optical sensor circuit 300 is the optical sensor circuit 5 described in the first embodiment or the optical sensor circuit 15 described in the second embodiment and uses, as a photoelectric conversion element (a-Si TFT1 and a-Si TFT2), the same a-Si TFT as an a-Si TFT provided in each pixel circuit P1. In addition, the optical detection circuit 350 is the optical detection circuit 10 described in the first embodiment or the optical detection circuit 20 described in the second embodiment. The optical detection circuit 350 detects the luminance of environmental light on the basis of a measurement result of the optical sensor circuit 300 and then outputs luminance data 350a, which is a detection result, to the light control circuit 400. In addition, the optical detection circuit 350 corrects photodegradation of the photoelectric conversion element in the optical sensor circuit 300 and detects the accurate luminance of environmental light. The light control circuit 400 makes the backlight 500, which is provided on a rear surface of the liquid crystal panel AA, emit light with the brightness corresponding to the luminance data 350a.

Light from the backlight 500 is emitted through the liquid crystal panel AA. Moreover, in the liquid crystal panel AA, pixels are provided in a matrix so as to correspond to the pixel circuits P1. Alignment or order of liquid crystal molecules changes according to a voltage level of a data signal applied to each pixel, such that a transmittance is controlled for every pixel. Accordingly, gray-scale display using light modulation becomes possible and an image is displayed on the image display region A.

Here, it depends on the ambient brightness how clearly a display image can be viewed. For example, under natural light in the daytime, it is necessary to make the whole screen bright by setting the emission brightness of the backlight 500 high. On the other hand, under a dark environment at night, a clear image can be displayed even if the emission brightness of the backlight 500 is not so high as in the daytime. Accordingly, the power consumption is reduced by setting the emission brightness of the backlight 500 low when the value of the luminance data 350a is small.

Thus, in the present embodiment, the emission brightness of the backlight 500 is adjusted on the basis of the luminance data 350a obtained by correcting the measurement result of the optical sensor circuit 300 (optical sensor circuits 5 or 15) in the optical detection circuit 350 (optical detection circuits 10 or 20). Accordingly, it is possible to make a display image clearly viewed or to reduce the power consumption of the display device 50 by controlling the brightness of a screen on the basis of the accurate luminance of environmental light. In addition, since the a-Si TFT provided in each pixel circuit P1 and two a-Si TFTs provided in the optical sensor circuit 300 are same, the two a-Si TFTs for the optical sensor circuit 300 and the circuit shown in FIG. 4 can be formed on the liquid crystal panel AA when manufacturing the liquid crystal panel AA.

Furthermore, even though a case in which the emission brightness of the backlight 500 is adjusted has been described in the present embodiment, the luminance data 350a output from the optical detection circuit 350 may be supplied to the image processing circuit 700 and a signal level of the image signal VID may be adjusted on the basis of the luminance data 350a in the image processing circuit 700. In this case, since the data line driving circuit 200 outputs the data signals X1 to Xn on the basis of the adjusted image signal VID, the brightness of the whole screen can be adjusted according to the luminance of environmental light.

4. Modifications

The invention is not limited to the embodiments described above but various kinds of modifications described below may be made, for example.

(1) A photoelectric conversion element may be an LTPS TFT (low-temperature poly-silicon TFT: low-temperature poly-silicon thin film transistor) or an HTPS TFT (high-temperature poly-silicon TFT: high-temperature poly-silicon thin film transistor), for example. In addition, light to be detected is not limited to environmental light (outside light) but may be light emitted from a light source, for example. Accordingly, the invention may also be applied to an image sensor and the like. In addition, the transmittance of the filter 3 is not limited to 10% but may be 20% or 50%, for example. In short, the transmittance of the filter 3 is preferably a predetermined transmittance smaller than 100%. Furthermore, even though a case in which the green color filter is used as the filter 3 has been described in the second embodiment, a color of a color filter that can be used as the filter 3 is not limited to green but may be red or blue, for example.

(2) In the third embodiment, the transmissive liquid crystal display device has been mentioned as a display device. However, the display device according to the embodiment of the invention may be a transflective liquid crystal display device or a reflective liquid crystal display device, for example. However, in the case of the reflective liquid crystal display device, the brightness of the whole screen is controlled by adjusting a signal level of the image signal VID on the basis of the luminance data 350a output from the optical detection circuit 350. In addition, the display device according to the embodiment of the invention may be an electro-optical device that uses an OLED (organic light emitting diode) element. The OLED element is a current-driving-type light-emitting element that emits light by itself unlike a liquid crystal device that changes the amount of light transmitted. Also in the case of an electro-optical device using the OLED element, the brightness of the whole screen is controlled by adjusting the signal level of the image signal VID on the basis of the luminance data 350a output from the optical detection circuit 350. In addition, the display device according to the embodiment of the invention may also be an electro-optical device that uses an electro-optical element other than the liquid crystal element or the OLED element. In addition, the electro-optics element refers to an element whose optical characteristics, such as a transmittance and the brightness, changes with supply of an electric signal (current signal or voltage signal). The invention may also be applied to a display panel using a light-emitting element such as an inorganic EL (electroluminescent) element and a light-emitting polymer element, an electrophoretic display panel using as an electro-optical material a microcapsule containing colored liquid and white particles dispersed in the liquid, a twist ball display panel using as an electro-optical material a twist ball in which regions having different polarities are divided by different colors, a toner display panel using a black toner as an electro-optical material, and a plasma display panel using a high pressure gas, such as helium or neon, as an electro-optical material, for example.

5. Electronic Apparatus

Figure 17:
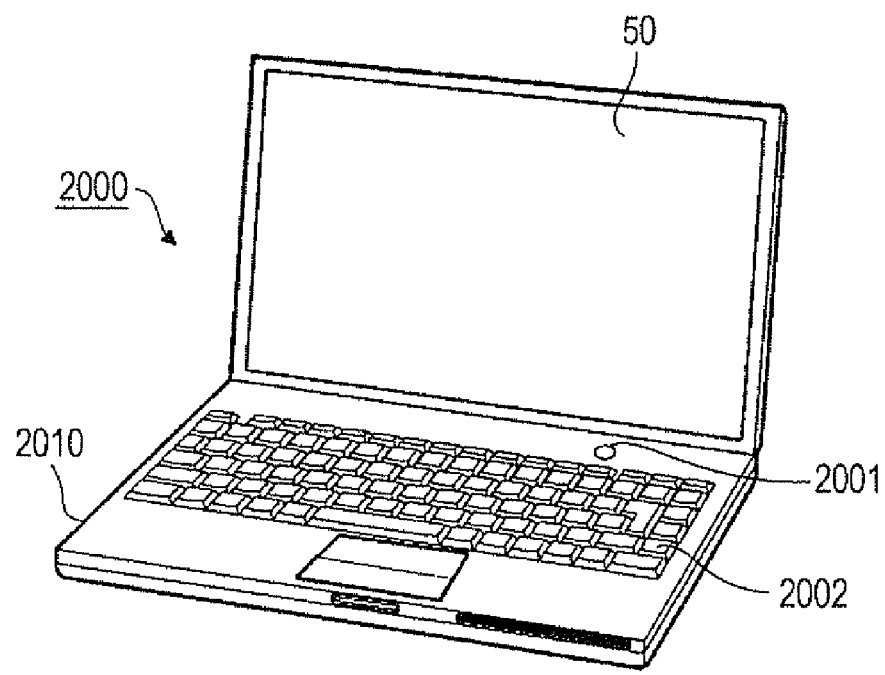
FIG. 17 is a perspective view illustrating a specific example of an electronic apparatus according to an embodiment of the invention.

Next, an electronic apparatus to which the display device 50 according to the above-described embodiments and modifications is applied will be described. FIG. 17 is a view illustrating the configuration of a mobile type personal computer to which the display device 50 is applied. A personal computer 2000 includes the display device 50 as a display unit and a main body 2010. A power switch 2001 and a keyboard 2002 are provided in the main body 2010.

Figure 18:
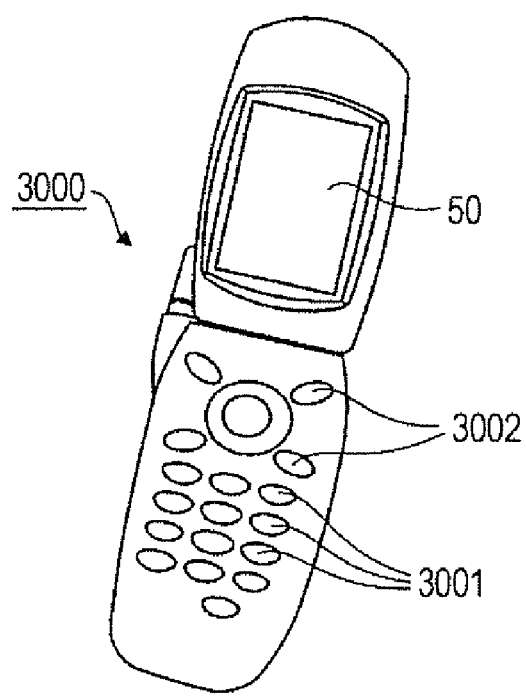
FIG. 18 is a perspective view illustrating a specific example of an electronic apparatus according to the embodiment of the invention.

FIG. 18 is a view illustrating the configuration of a mobile phone to which the display device 50 is applied. A mobile phone 3000 includes a plurality of operation buttons 3001, a plurality of scroll buttons 3002, and the display device 50 as a display unit. A screen displayed on the display device 50 is scrolled by operating the scroll buttons 3002.

Figure 19:
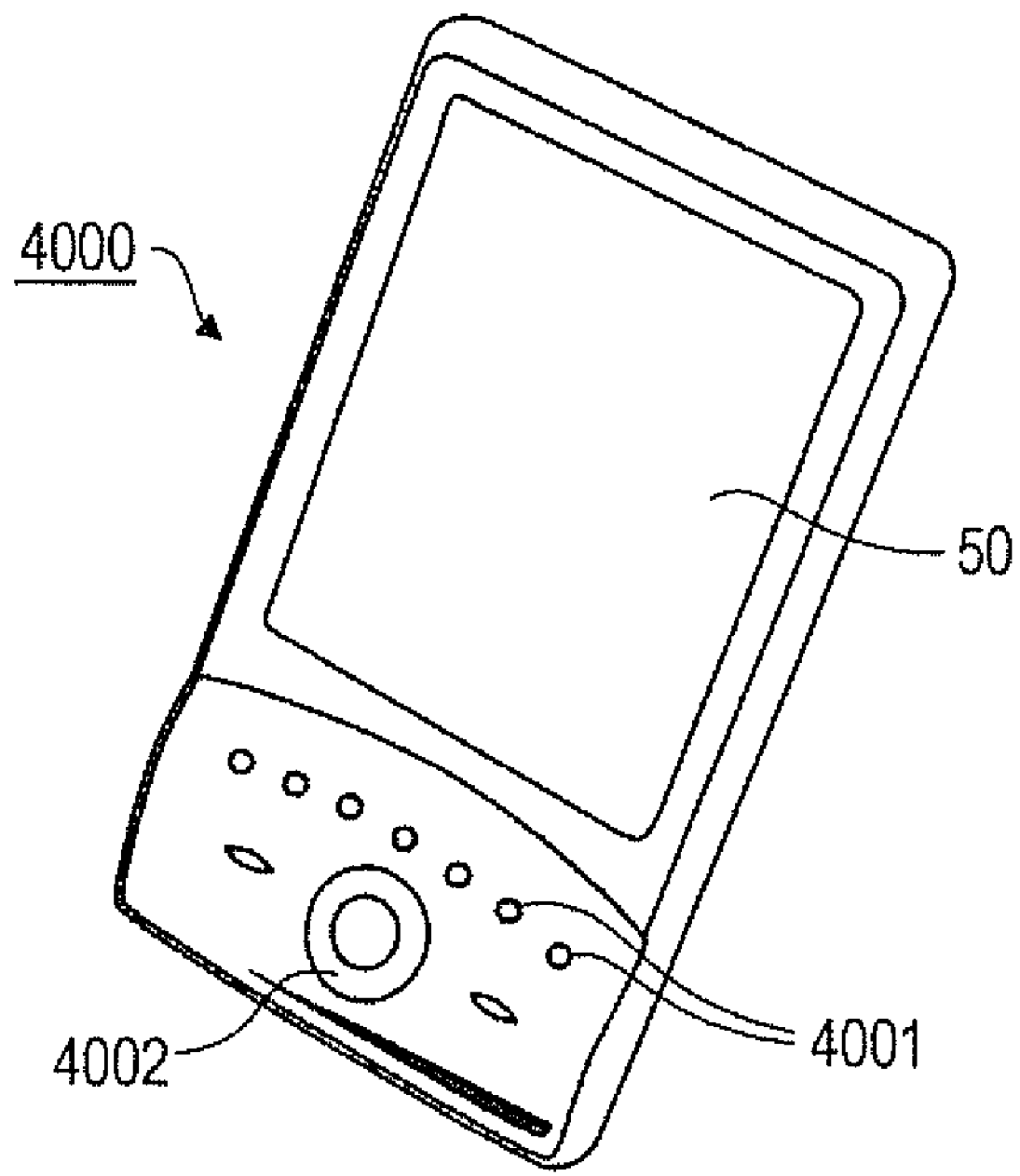
FIG. 19 is a perspective view illustrating a specific example of an electronic apparatus according to the embodiment of the invention.

FIG. 19 is a view illustrating the configuration of a personal digital assistant (PDA) to which the display device 50 is applied. A personal digital assistant 4000 includes a plurality of operation buttons 4001, a power switch 4002, and the display device 50 as a display unit. By operating the power switch 4002, various kinds of information, such as an address list or a schedule book, are displayed on the display device 50.

In addition, examples of an electronic apparatus to which the display device 50 is applied include a digital still camera, a liquid crystal television, a view finder type or monitor direct view type video tape recorder, a car navigation system, a pager, an electronic diary, an electronic calculator, a word processor, a workstation, a video phone, a POS terminal, an apparatus having a touch panel, and the like, as well as those shown in FIGS. 17 to 19. In addition, the display device 50 described above may be applied as a display unit of each of the various kinds of electronic apparatuses.

6. Others

The invention may also be applied to a temperature sensor.

For example, two equal thermo-sensitive elements (thermocouple, resistance temperature detectors, or thermistors) having the same thermo-sensitive characteristics are used, only one of the thermo-sensitive elements is covered with a heat insulation member, and the temperature applied to one thermo-sensitive element covered with the heat insulation member is reduced to 50% of that applied to the other thermo-sensitive element. In addition, profile data or function indicating the relationship between a rate of degradation, which indicates a degree of degradation of temperature characteristics, and an integrated temperature (temperature×time) applied to a thermo-sensitive element is stored in a memory. In addition, by using a measurement value (for example, a voltage value between both ends of each thermo-sensitive element obtained by supplying a constant current to each thermo-sensitive element) obtained by using each of the two thermo-sensitive elements, a reduction rate of temperature due to the heat insulation member, and profile data or function stored in the memory, for example, a rate of degradation of the thermo-sensitive element not covered with the heat insulation member is specified and an accurate temperature is detected on the basis of the specified rate of degradation and the measurement value of the thermo-sensitive element not covered with the heat insulation member in the same manner as the case of the optical detection circuit 10 described in the first embodiment. Alternatively, a configuration in which profile data or function indicating the relationship between a rate of degradation, which indicates a degree of degradation of temperature characteristics, and a ratio of measurement values of two thermo-sensitive elements is stored in a memory may be adopted. In this case, by using the ratio of measurement values of the two thermo-sensitive elements, a reduction rate of temperature due to the heat insulation member, and profile data or function stored in the memory, for example, a rate of degradation of the thermo-sensitive element not covered with the heat insulation member is specified and an accurate temperature is detected on the basis of the specified rate of degradation and the measurement value of the thermo-sensitive element not covered with the heat insulation member in the same manner as the case of the optical detection circuit 20 described in the second embodiment.

Those described above are summarized as follows. Here, it is also possible to specify a rate of degradation of the thermo-sensitive element covered with the heat insulation member and to detect the accurate temperature on the basis of the specified rate of degradation, the measurement value of the thermo-sensitive element covered by the heat insulation member, and the reduction rate of temperature due to the heat insulation member.

A temperature detection circuit includes: a first thermo-sensitive element capable of obtaining a first measurement signal with a level corresponding to heat energy (temperature) applied to the element; a second thermo-sensitive element that has the same thermo-sensitive characteristic as the first thermo-sensitive element and is capable of obtaining a second measurement signal with a level corresponding to the heat energy (temperature) applied to the element; a heat insulation unit that reduces the temperature applied to the second thermo-sensitive element in a predetermined reduction rate; a storage unit that stores as a degradation characteristic the relationship between a first rate of degradation, which indicates a degree of degradation of the thermo-sensitive characteristic of the first thermo-sensitive element, and an integrated temperature applied to the first thermo-sensitive element; a specifying unit that specifies a plurality of sets of the first rate of degradation and a second rate of degradation, which indicates a degree of degradation of the thermo-sensitive characteristic of the second thermo-sensitive element, by referring to the degradation characteristic in consideration of the predetermined reduction rate, calculates the temperature applied to the first thermo-sensitive element and the temperature applied to the heat insulation unit on the basis of each of the specified plurality of sets of the first rate of degradation and the second rate of degradation, the first measurement signal and the second measurement signal, and the predetermined reduction rate, and specifies the set of the first rate of degradation and the second rate of degradation whose difference becomes a minimum on the basis of a result of the calculation; and a detection unit that detects the temperature on the basis of the first rate of degradation specified by the specifying unit and the first measurement signal.

A temperature detection circuit includes: a first thermo-sensitive element capable of obtaining a first measurement signal with a level corresponding to heat energy (temperature) applied to the element; a second thermo-sensitive element that has the same thermo-sensitive characteristic as the first thermo-sensitive element and is capable of obtaining a second measurement signal with a level corresponding to the heat energy (temperature) applied to the element; a heat insulation unit that reduces the temperature applied to the second thermo-sensitive element in a predetermined reduction rate; a storage unit that stores as a degradation characteristic the relationship between a first rate of degradation, which indicates a degree of degradation of the thermo-sensitive characteristic of the first thermo-sensitive element, and an output ratio that is a ratio between a level of the first measurement signal and a level of the second measurement signal; a specifying unit that calculates a ratio between a level of the first measurement signal and a level of the second measurement signal, compares the calculated ratio with an output ratio of the degradation characteristic obtained by referring to the storage unit, and specifies the first rate of degradation on the basis of a result of the comparison; and a detection unit that detects the temperature on the basis of the first rate of degradation specified by the specifying unit and the first measurement signal.

In addition, the invention may also be applied to a sensor that detects the intensity of sound. Thus, in the invention, two sensing elements having the same sensing characteristics (input and output characteristics) are used, energy of light, temperature, or sound applied to one of the sensing elements is reduced in a predetermined reduction rate and degradation characteristic of the sensing elements are stored in a memory, and a rate of degradation of one of the sensing elements is specified by using a measurement value obtained by using each of the two sensing elements, a predetermined reduction rate, and the degradation characteristic stored in the memory and an accurate detection value is obtained by using the specified rate of degradation.

The entire disclosure of Japanese Patent Application No. 2007-161001, filed Jun. 19, 2007 is expressly incorporated by reference hereby.

What is claimed is:

1. A sensing circuit comprising:
    a first sensing element that measures energy and outputs a first output signal with a level corresponding to the amount of measured energy;
    a second sensing element that has the same sensing characteristic as the first sensing element and measures energy and outputs a second output signal with a level corresponding to the amount of measured energy;
    a reduction unit that reduces the amount of the energy applied to the second sensing element by a predetermined reduction rate;
    a storage unit that stores a degradation characteristic of the sensing element;
    a specifying unit that specifies a rate of degradation, which indicates a degree of degradation of the input and output characteristics of the sensing element, by referring to the degradation characteristic in consideration of the predetermined reduction rate; and
    a detection unit that detects the amount of the energy on the basis of the rate of degradation specified by the specifying unit and the output signal.

2. The sensing circuit according to claim 1,
    wherein the storage unit stores as the degradation characteristic a relationship between the rate of degradation and an integrated value that is a product of the amount of the energy applied to the sensing element and time.

3. The sensing circuit according to claim 1,
    wherein the specifying unit that:
        specifies a plurality of sets of a first rate of degradation, which indicates a degree of degradation of the input and output characteristics of the first sensing element, and a second rate of degradation, which indicates a degree of degradation of the input and output characteristics of the second sensing element, by referring to the degradation characteristic in consideration of the predetermined reduction rate;
        calculates the amount of the energy applied to the first sensing element and the amount of the energy input to the reduction unit on the basis of each of the specified plurality of sets of the first rate of degradation and the second rate of degradation, the first output signal and the second output signal, and the predetermined reduction rate, and;
        specifies one set of the plurality of sets of the first rate of degradation and the second rate of degradation whose difference becomes a minimum on the basis of the result of the calculation.

4. The sensing circuit according to claim 1,
    wherein the storage unit stores as the degradation characteristic a relationship between a first rate of degradation, which indicates a degree of degradation of the input and output characteristics of the first sensing element, and an output ratio that is a ratio between a level of the first output signal and a level of the second output signal.

5. The sensing circuit according to claim 4,
    wherein the specifying unit that:
        calculates a ratio between the level of the first output signal and the level of the second output signal;
        compares the calculated ratio with the output ratio of the degradation characteristic obtained by referring to the storage unit; and
        specifies the first rate of degradation on the basis of the result of the comparison.

6. The sensing circuit according to claim 1,
    wherein the storage unit stores as the degradation characteristic a relationship between a second rate of degradation, which indicates a degree of degradation of the input and output characteristics of the second sensing element, and an output ratio that is a ratio between a level of the first output signal and a level of the second output signal.

7. The sensing circuit according to claim 6,
    wherein the specifying unit that:
        calculates a ratio between the level of the first output signal and the level of the second output signal;
        compares the calculated ratio with the output ratio of the degradation characteristic obtained by referring to the storage unit; and
        specifies the second rate of degradation on the basis of the result of the comparison.

8. The sensing circuit according to claim 1,
    wherein the detection unit that detects the amount of the energy on the basis of the first rate of degradation specified by the specifying unit and the first output signal.

9. The sensing circuit according to claim 1,
    wherein the detection unit detects the amount of the energy on the basis of the second rate of degradation specified by the specifying unit, the second output signal, and the predetermined reduction rate.

10. An optical detection circuit comprising:
    a first photoelectric conversion element that outputs a first output signal with a level corresponding to the luminance of incident light;
    a second photoelectric conversion element that has the same photoelectric conversion characteristic as the first photoelectric conversion element and outputs a second output signal with a level corresponding to the luminance of incident light;
    a light reducing unit that reduces the luminance of incident light in a predetermined light reduction rate and outputs the reduced light to the second photoelectric conversion element;
    a storage unit that stores a degradation characteristic of the photoelectric conversion element;
    a specifying unit that assuming that an integrated luminance of the first photoelectric conversion element is a first integrated luminance, an integrated luminance of the second photoelectric conversion element is a second integrated luminance, a rate of degradation corresponding to the first integrated luminance is a first rate of degradation, and a rate of degradation corresponding to the second integrated luminance is a second rate of degradation, refers to the degradation characteristic stored in the storage unit, specifies the rate of degradation; and a calculation unit that calculates the luminance of incident light on the basis of the rate of degradation specified and the output signal.

11. The optical detection circuit according to claim 10, wherein the storage unit that stores as the degradation characteristic a relationship between the rate of degradation and the integrated luminance.

12. The optical detection circuit according to claim 11, wherein the storage unit stores as the degradation characteristic a function that defines the relationship between the rate of degradation and the integrated luminance.

13. The optical detection circuit according to claim 10, wherein the specifying unit comprises:

an acquisition unit that specifies a set of the first integrated luminance and the second integrated luminance, in consideration of the predetermined light reduction rate, refers to the degradation characteristic stored in the storage unit on the basis of the first integrated luminance and the second integrated luminance that are specified, and acquires a set of the first rate of degradation and the second rate of degradation corresponding to the set of the first integrated luminance and the second integrated luminance that are specified;

a difference calculating unit that assuming that the luminance of light incident on the first photoelectric conversion element is a first luminance and the luminance of light incident on the second photoelectric conversion element through the light reducing unit is a second luminance, calculates the first luminance on the basis of the first output signal and the first rate of degradation, calculates the second luminance on the basis of the second output signal and the second rate of degradation, and calculates a difference between the first luminance and the second luminance; and the specifying unit supplies to the difference calculating unit a set of the first rate of degradation and the second rate of degradation obtained by using the acquisition unit, and specifies the set of the first rate of degradation and the second rate of degradation when the difference becomes a minimum.

14. The optical detection circuit according to claim 10, wherein the storage unit that stores as the degradation characteristic a relationship between the first rate of degradation and an output ratio which indicates a ratio between a level of the first output signal and a level of the second output signal.

15. The optical detection circuit according to claim 14, wherein the storage unit stores as the degradation characteristic a function that defines the relationship between the first rate of degradation and the output ratio.

16. The optical detection circuit according to claim 10, wherein the storage unit that stores as the degradation characteristic a relationship between the second rate of degradation and an output ratio which indicates a ratio between a level of the first output signal and a level of the second output signal.

17. The optical detection circuit according to claim 16, wherein the storage unit stores as the degradation characteristic a function that defines the relationship between the second rate of degradation, and the output ratio.

18. The optical detection circuit according to claim 10, wherein the specifying unit comprises:

an output ratio calculating unit that calculates an output ratio, which indicates a ratio between a level of the first output signal and a level of the second output signal;

a difference calculating unit that calculates a difference between each of a plurality of output ratios obtained by referring to the storage unit and the output ratio calculated in the output ratio calculating unit; and the specifying unit specifies the first rate of degradation and the second rate of the degradation when the difference becomes a minimum.

19. The optical detection circuit according to claim 10, wherein the detection unit calculates the luminance of incident light on the basis of the first rate of degradation, and the first output signal.

20. The optical detection circuit according to claim 10, wherein the detection unit calculates the luminance of incident light on the basis of the second rate of degradation, the second output signal, and the predetermined light reduction rate.

21. The optical detection circuit according to claim 10, wherein the light reducing unit is a green color filter.

22. A display device comprising:

the optical detection circuit according to claim 10;

a display unit that displays an image; and an adjustment unit that adjusts the luminance of an image on the display unit on the basis of an output signal of the optical detection circuit.

* * * * *